(12) United States Patent
Hutchings et al.

(10) Patent No.: US 9,487,631 B2
(45) Date of Patent: Nov. 8, 2016

(54) SURFACE ACTIVE POLYMERIC SYSTEMS

(75) Inventors: Lian Richard Hutchings, Darlington (GB); William James Feast, Durham (GB); Richard Lewis Thompson, Durham (GB); Amilcar Pillay-Narrainen, Durham (GB)

(73) Assignee: University of Durham, Durham (GB)

( * ) Notice: Subject to any disclaimer, the term of this patent is extended or adjusted under 35 U.S.C. 154(b) by 1559 days.

(21) Appl. No.: 11/915,122

(22) PCT Filed: May 22, 2006

(86) PCT No.: PCT/GB2006/001866
§ 371 (c)(1),
(2), (4) Date: Sep. 28, 2009

(87) PCT Pub. No.: WO2006/125965
PCT Pub. Date: Nov. 30, 2006

(65) Prior Publication Data
US 2010/0036054 A1    Feb. 11, 2010

(30) Foreign Application Priority Data

May 21, 2005 (GB) .................................. 0510414.6
May 28, 2005 (GB) .................................. 0511001.0

(51) Int. Cl.
| C08L 25/06 | (2006.01) |
| C08G 83/00 | (2006.01) |
| C08L 101/00 | (2006.01) |

(52) U.S. Cl.
CPC ......... *C08G 83/003* (2013.01); *C08L 101/005* (2013.01)

(58) Field of Classification Search
None
See application file for complete search history.

(56) References Cited

U.S. PATENT DOCUMENTS

| 3,794,697 | A | * | 2/1974 | Bronstert et al. ............... 525/71 |
| 4,698,411 | A | | 10/1987 | Hill et al. |
| 5,834,020 | A | * | 11/1998 | Margerum et al. ............ 424/484 |
| 6,225,404 | B1 | * | 5/2001 | Sorensen et al. ............. 525/54.1 |
| 6,582,755 | B2 | | 6/2003 | Boa et al. |
| 2002/0002242 | A1 | * | 1/2002 | McNamara et al. ........... 525/107 |
| 2002/0151655 | A1 | * | 10/2002 | McNamara et al. ........... 525/242 |
| 2003/0035991 | A1 | | 2/2003 | Colombo et al. |

FOREIGN PATENT DOCUMENTS

| JP | 2000-239360 |   | 9/2000 |
| JP | 2002-338622 | * | 5/2001 |
| WO | WO 93/21259 |   | 10/1993 |
| WO | WO 95/06081 |   | 3/1995 |

OTHER PUBLICATIONS

Office Action and search report from corresponding application EP 06 743 947.1.
(Continued)

*Primary Examiner* — Jeffrey Washville
(74) *Attorney, Agent, or Firm* — Baker & Hostetler LLP

(57) ABSTRACT

A polymer comprising a bulk polymer or copolymer $P_B$ together with an amount of a polymer-dendron additive $D-P_D$ of formula (I):

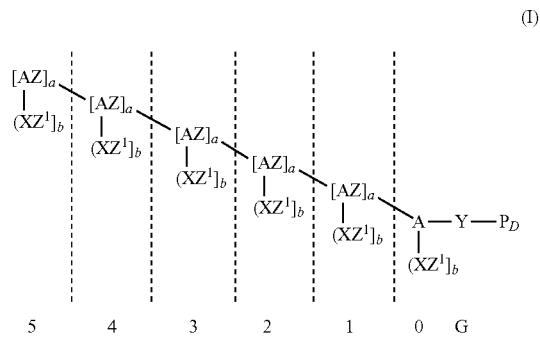

is provided, such that the polymer comprises from 0.001 to 50% of dendron-additive $D-P_D$ calculated as weight of dendron D in polymers $D-P_D$ and $P_B$, wherein:

$P_D$ is a polymer chain comprising at least one monomer repeat unit and is cyclic (having no ends) or has at least two ends and is linked to group Y in chain or at least one of its ends;

Y is a linking group;

a and b are each zero or a whole number integer in the range from 1 to 5;

A is a branching group;

each $XZ^1$ is a functional group independently selected from one or more of OH, halo, amino, cyano, carboxylic acid, ester, thiol, silane, azide, alkyl, alkenyl, alkynyl, oligoalkyl, oligoalkenyl, oligoalkylether or any organometallic group, a linear, branched or cyclic $C_{1-20}$ alkyl, alkenyl or cycloalkyl group optionally comprising a heteroatom O or S and comprising from 3 to 37 functional groups selected from halo, OH, $NR_2$, CN, COOH, COOR, SR, $SiCl_3$, $SiRCl_2$, $SiR_2Cl$, $Si(OR)_3$, and a combination thereof;

Z is O or S; is derived as functional groups as hereinbefore defined;

G indicates the Generation of a given dendron, in which both a (where present) and b are in the range 1 to 5.

41 Claims, No Drawings

(56) References Cited

OTHER PUBLICATIONS

Tande, B., et al., Compes Rendus Chimie, (2003), 6, pp. 853-864.
Roman, C., et al., Macromolecules, (1999), 32, pp. 5525-5531.
Aoi, K., et al., Polymer Journal, (1999) 31, pp. 1071-1078.
Van Hest, J.C.M., et al., Chem. Eur. J., (1996), 2, pp. 1616-1626.
Iyer, J., et al., Macromolecules, (1998), 31, 8757-8765.
ISR for PCT/GB/2006/001866 dated Aug. 1, 2006.
Search Report for GB 0510414.6 dated Oct. 20, 2005.
Hawker, C.J. et al. Preparation of Polymers with Controlled Molecular Architecture. A new Convergent Approach to Dendritic Macromolecules, J. Am. Chem. Soc., vol. 112, pp. 7638-7647, (1990).
Pyun, J. et al. Synthesis and Direct Visualization of Block Copolymers Composed of Different Macromolecular Architectures, Macromolecules, vol. 38, pp. 2674-2685, (Mar. 1, 2005).
Ashraf A. El-Shehawy et al., Macromolecules 2005, 38, 8285-8299.
Exam Report and supplemental search report from corresponding application EP 06 743 947.1, issued Jul. 13, 2015.
Feng, F. et al., Chinese Science Bulletin, 2012, 57(33), 4289-4295.
Jeong, M. et al., Macromolecules, 2001, 34, 4927-4936.
Mackay, M.E. et al., Macromolecules, 2002, 35, 8391-8399.

\* cited by examiner

SURFACE ACTIVE POLYMERIC SYSTEMS

This application is a national stage filing of International Application No. PCT/GB2006/001866, filed May 22, 2006, published as WO 2006/125965 A1 on Nov. 30, 2006, which claims priority from Application No. GB 0510414.6, filed May 21, 2005, and Application No. GB 0511001.0, filed May 28, 2005, all of which are incorporated herein by reference.

The present invention relates to novel surface active polymer systems, more particularly to polymers end-capped with functionalised dendrons, polymeric blends thereof, processes for the preparation thereof, and surface or interface active uses and polymer processing uses thereof.

Currently low molecular weight fluorinated materials are provided for use in applications that require a surface with different properties to that of the bulk polymer. An example of such a property would be reduced surface energy for anti-fouling applications. There is a need for improved materials which provide an enhanced lifetime of the surface layer as compared with small molecule solutions to the same problem.

Supercritical carbon dioxide ($ScCO_2$) is a benign medium that has shown great potential as a replacement for conventional organic solvents. Over the past decade it has been investigated as a solvent for a variety of chemical processes such as polymerization and materials processing, in particular polymer processing catalysis, and extraction. There are many advantages associated with the use of $CO_2$ as a reaction or processing solvent, including lack of toxic solvent residues, low cost, easily accessible critical point, and tuneable solvent power. However, $CO_2$ is a poor solvent for high molecular weight compounds, with the exception of amorphous or low-melting fluoropolymers and silicones. As a result, processes in $scCO_2$ often require the aid of a surfactant to ensure dispersion of the desired solute in the continuous phase. In many, the use of a fluorinated surfactant is proposed, which is often a linear block copolymer.

We have synthesised Fréchet-type poly(aryl ether) dendrons, of the general architecture (shown in Schematic) below with peripheral groups X and a focal benzyl bromide functionality, Y=Br, (Hawker C J and Fréchet J M J, *J. Am Chem Soc* 1990, 112 (21) 7638-7647) as initiators for atom transfer radical polymerisation of, for example styrene and methyl methacrylate. We obtained polymers of predetermined molecular weights and fairly narrow polydispersities (~1.3).

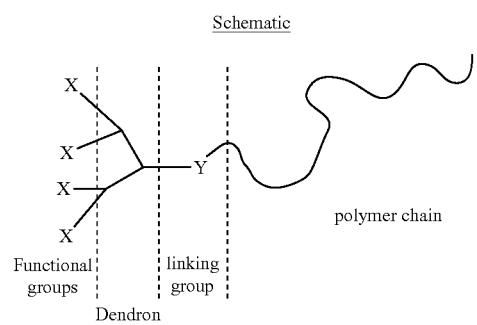

Schematic

Dendron

We have now found that Fréchet-type poly(aryl ether) dendrons with different peripheral groups X can be attached to a variety of polymer chains by modification of the functionality Y at the focus of the dendron (see Schematic above).

Accordingly the invention provides a novel class of polymer comprising in combination a functional group X, located at the periphery of a Fréchet-type dendron architecture, and a variety of polymer chain types attached at the core or focus of the dendron.

Moreover we have found that these materials can be added to a bulk polymer and, depending upon the nature of the functional group X at the periphery, can modify the properties at a surface or interface. Without being limited to this theory, we believe that this dendron end-functionalised polymer chain architecture may be able to anchor via chain entanglements into a bulk polymer matrix whereby it is retained at the surface of the matrix.

Accordingly in a first aspect of the invention there is provided a polymer comprising a bulk polymer or copolymer $P_B$ together with an amount of a polymer-dendron additive $D-P_D$ of the formula (I):

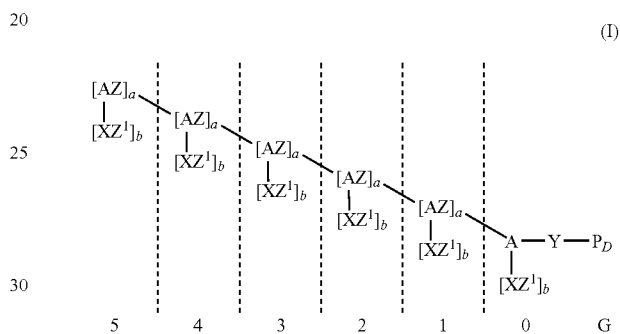

such that the polymer comprises from 0.001 to 50% of dendron-additive $D-P_D$ calculated as weight of dendron D in polymers $D-P_D$ and $P_B$
wherein:
$P_D$ is a polymer chain comprising at least one monomer repeat unit and is cyclic (having no ends) or has at least two ends and is linked to group Y in chain or at least one of its ends;
Y is a linking group;
a and b are each zero or a whole number integer in the range from 1 to 5;
A is a branching group;
each $XZ^1$ is a functional group independently selected from one or more of OH, halo, amino, cyano, carboxylic acid, ester, thiol, silane, azide, alkyl, alkenyl, alkynyl, oligoalkyl, oligoalkenyl (for example oligobutadiene), oligoalkylether (for example oligoethylene oxide) or any organometallic group, a linear, branched or cyclic $C_{1-20}$ alkyl, alkenyl or cycloalkyl group optionally comprising a heteroatom O or S and comprising from 3 to 37 functional groups selected from halo, for example F or Cl, OH, $NR_2$, CN, COOH, COOR, SR, $SiCl_3$, $SiRCl_2$, $SiR_2Cl$, $Si(OR)_3$, wherein R is for example a $C_{1-6}$ alkyl group, and a combination thereof;
Z is O or S; is derived as functional groups as hereinbefore defined;
G indicates the Generation of a given dendron, in which both a (where present) and b are in the range 1 to 5.
In one embodiment of the additives of formula (I):
$P_D$ is a polymer chain comprising at least one monomer repeat unit and is cyclic (having no ends) or has at least two ends and is linked to group Y in chain or at least one of its ends;

P Y is a linking group;

a and b are each zero or a whole number integer in the range from 1 to 5;

AZ is $Ar(CR'_2)_nZ$, where Ar is Phenyl (Ph), R' is H or $CH_3$ and n is a whole number integer selected from 1 to 12;

each $XZ^1$ is a functional group independently selected from a linear, branched or cyclic $C_{1-20}$ alkyl or cycloalkyl group comprising a heteroatom Z and comprising from 3 to 37 F atoms;

Z is O or S;

G indicates the Generation of a given dendron, in which both a (where present) and b are in the range 1 to 5.

Preferably one of b in a given generation and a in the next increasing generation is zero and the other thereof is selected from a whole number integer from 1 to 5. The polymer dendron-additive therefore comprises dendron with a "surface layer" of functional groups X. Preferably where b is a whole number integer less than 5, all other substitutions on A are H.

Preferably linking group Y is selected from a single or double bond, hydrocarbon and any functional group or heteroatom. Y may be derived from the reaction of the dendron and either the polymer chain $P_B$ or monomers thereof.

Preferably AZ is selected from hydrocarbon optionally including additional atoms, and is preferably $C_{1-22}$ alkyl, alkenyl, alkynyl, cycloalkyl or aryl or a combination thereof optionally including heteroatoms O, S, Si, P or N; AZ, the branching repeat unit is made up from a $C_{1-22}$ species that can be linear, cyclic, saturated, unsaturated and contain heteroatoms from the attached list. More preferably alternatives to the Benzyl ether dendrons include, aromatic and aliphatic polyester, aliphatic polyether, polysilane, polycarbosilane, polyphenylene, polyimide, polyamide, polyaminoamide, polyurethane, and $(CR'_2)_nArZ$, where Ar is Phenyl (Ph), R' is H or $CH_3$ and n is a whole number integer selected from 1 to 12.

Preferably $P_B$ and $P_D$ are miscible or otherwise compatible. The polymer as hereinbefore defined may be a blend of additive of formula I with $P_B$. We are not aware of any previous uses of a dendron end-functionalised polymer chain as an additive with a bulk polymer, either as a blend or a copolymer, for the purpose of conferring surface active properties or polymer processing properties. The polymer is preferably in fluid form as a solution, suspension, emulsion or the like or in solid form, as granules, powder, flakes, or the like. Polymer may be used for shaping as a product as hereinbelow defined, in which additive provides product properties or provides processing properties (emulsion etc).

Over the last few decades we have come to understand that the relative effective areas of headgroups to tail groups has a profound effect on properties of surfactants in solution. In polymer systems the situation is complicated by their flexible structure, but nevertheless, it is well established that the relative dimensions of blocks in block copolymers also controls their organisation in blends in a similar way. Whilst theoretical predictions demonstrate that simple diblock copolymers should be highly efficient at adsorbing at a particular interface, experiments show that polymer micelle formation generally inhibits their ability to fulfil this potential.

New polymer structures may be able to overcome this problem but the complexity of long-chain polymers in blends, and the possibility of metastable non-equilibrium states is highly problematic for realistic computer simulations. It is therefore still necessary to carry out experimental investigations of novel copolymer structures in order to establish their physical properties.

We have now surprisingly found that the presence of the polymer chain $P_D$ that is compatible with the polymer matrix $P_B$ will result in an enhanced lifetime of the bulk surface layer as compared with small molecule solutions to the same problem.

Preferably the polymer comprises from 0.001% to 50% of additive of formula I expressed as wt % dendron with respect to combined weight of additive D-$P_D$ and bulk polymer $P_B$, preferably 0.001% to 5%, more preferably from 0.001% to 3%, more preferably from 0.001% to 2.5%, more preferably from 0.001% to 1% or 1 to 2% or 0.5 to 1.5%. In a particular advantage of the invention we have found that low concentrations of additives of formula I in a blend with bulk polymer confer surface or interface properties to the blend approaching that of pure additive. Without being limited to this theory we attribute this to surface saturation by the additive whereby surface or interface effects are approaching that which would be achieved with 100% additive.

Whilst it is known that polymer chains end-functionalised with dendrons form stratified structures, the lack of any prior work relating to blends thereof with bulk polymers means that their behaviour therein was entirely unknown. We have found that the functionalised polymeric additives diffuse through the bulk polymer to a surface or interface. We have investigated this diffusion using ion beam analysis, and have assessed the effect of these additives on surface properties, for example on hydrophobicity, hydrophilicity or lipophilicity, by solvent contact angle measurements.

Whilst much of the following discussion focuses on fluorocarbon functional groups X, the invention should not be considered to be so limited.

We have found that the low surface energy of the fluorocarbon functional groups X causes the functionalised polymer to spontaneously segregate to the surface of the bulk polymer $P_B$, preferably conferring stratified and/or surface properties, whilst remaining miscible with the bulk polymer $P_B$. In a particular advantage we have found that only low levels of additive of formula I are required, to give a similar effect as would be achieved with 100% functionalised polymer, whereby the invention provides an efficient use of functionality.

We have moreover surprisingly found that segregation takes place, in particular in solvent cast films, with no or minimal annealing, eg with no or minimal heating.

Moreover we have found that the polymer having multiple fluorocarbon functional groups $F_D$ enables much greater surface adsorption than would be possible with a single fluorocarbon group on the polymer chain end.

Preferably therefore D-$P_D$ comprises a uniform divergent structure characterised by a number of generations G from 0 or 1 to 5 and terminating in a surface layer of functional groups X.

Preferably generations G are 0, 1, 2 or 3, i.e. a is 0 in Generation 1, 2, 3, or 4 and b is from 1 to 5 in Generation 0, 1, 2 or 3. This may enable the number of functional groups to be tailored to optimise properties. In a particular advantage, the greater G the proportionally greater the number of functional groups, and the size of the footprint of the functional groups, maximising the surface effect of the functional groups, preferably the adsorption efficiency of fluorocarbon functional groups.

Preferably a and b are each 0 or 1, 2 or 3, and each [A-Z] or [$XZ^1$] group is meta (m-), para (p-) or a combination thereof, preferably is m-, m-; p-; m-, p-; or m-, p-, m-.

Preferably in the group A which is $(CR'_2)_n$ Ph, each n is independently selected from the range 1 to 6, more preferably is 1, 2 or 3.

We have found that a particularly effective functional group X is $F_D$ which is a linear group $(CR_2)_{m'}F_D'C(F_D'')_3$ where R is H or $CH_3$, m' is selected from 0 and a whole number integer from 1 to 15 and $F_D'$ is $C_{1-10}$ linear perfluoroalkyl, preferably is $(CF_2)m''$, where m'' is selected from a whole number integer from 1 to 15, and each $F_D''$ is independently selected from F, $CH_2F$, $CHF_2$ and $CF_3$; or $F_D$ is a cyclic group $(CR_2)_m C_{3-10}F_{4-18}$:

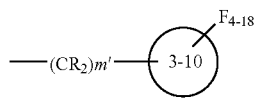

preferably wherein each ring C is doubly F substituted and the linking ring C is H substituted.

Preferably $F_D$ is a linear group $(CR_2)_{m'}F_D'C(F_D'')_3$ and each R is H, each m' is independently selected from 0 and 1 to 6, and each m'' is independently selected from 2 to 7.

Preferably for ease of synthesis in any one generation or in any one group or both, each n is the same, each m' is the same, or each m'' is the same, or a combination thereof. More preferably each functional group $F_D$ is the same. However differences may be envisaged.

Further, preferred functionalities which may be displayed from the surface of dendrons according to this invention are polyethylene glycol (PEG) functionalities and carboxylic acid groups; these may be used to proved hydrophilic surfaces. Alternatively, functionalisation with oxygen-scavenging moieties such as oligobutadiene groups is advantageous (for example in allowing the preparation of polyethylene terephthalate (PET) or polyethylene napthalate (PEN) with improved barrier properties.

Preferably Y is a linking group selected from —$CH_2$—, —CH═, —S—, —O—, —$CH_2$OPhCH═, —COO—, —CONH—, —COS—, —CO— and the like.

$P_D$ as hereinbefore defined is a polymer chain comprising at least one monomer repeat unit and having no ends, i.e. being a cyclic polymer including D, or having at least two ends. Preferably $P_D$ has two chain ends. Without being limited to this theory we believe that the polymer chain $P_D$ being entangled with the bulk polymer chains $P_B$ beneath the surface ensures the durability of the modified surface, and ensures mechanical stability of the surface layer.

The bulk polymer $P_B$ and polymer chain $P_D$ independently may be of any desired weight or polydispersity for the intended application. Preferably $P_D$ is of any desired molecular weight Mn, in the range up to 20,000 g/mol or greater than 20,000 g/mol, preferably from 2,000 to 20,000 g/mol. Preferably $P_D$ is of polydispersity index (PDI) given as Mw/Mn of from 1.0 to 5.0, preferably 1.0 to 3.0, more preferably from 1.0 to 2.0. There is a trade off wherein higher molecular weight of polymer $P_D$ gives better anchoring but at the expense of (i) % fluorocarbon surface coverage and (ii) rate of surface modification.

Preferably $P_B$ is of molecular weight Mn in the range 5,000 to 1,000,000 g/mol, more preferably in the range 5,000 g/mol to 100,000 g/mol. In one embodiment $P_B$ is of molecular weight substantially greater than $P_D$ and is substantially independent thereof, and in an alternative embodiment $P_B$ and $P_D$ are of similar molecular weight.

The bulk polymer $P_B$ and polymer chain $P_D$ may be selected from any suitable bulk polymer which it is desired to modify and any polymer chain which may be end-functionalised with D, selected from any natural or synthetic biodegradable or non-biodegradable polymers. Preferably the polymer is selected from homopolymers, block and random copolymers, polymeric blends and composites of monomers which may be straight chain, (hyper) branched or cross-linked. Polymers may include but are not limited to the following which are given as illustration only:

polyesters including poly(lactide), poly(glycolide), copolymers thereof, copolymers thereof with poly(ethylene glycol), poly(ε-caprolactone), poly(3-hydroxybutyrate), poly (p-dioxanone), poly(propylene fumarate); poly(ortho esters) including polyol/diketene acetals addition polymers; polyanhydrides including poly(sebacic anhydride) (PSA), poly (carboxybisbarboxyphenoxyphenoxyhexane) (PCPP), poly [bis(p-carboxyphenoxy)methane] (PCPM), copolymers of SA, CPP and CPM; poly(amino acids); poly(pseudo amino acids); polyphosphazenes including derivatives of poly[(dichloro) phosphazene], poly[(organo) phosphazenes]; and azo polymers;

polyimides, vinyl polymers including polyethylene, poly (ethylene-co-vinyl acetate), polypropylene, polyphenylene oxide (PPO) poly(vinyl chloride), poly(vinyl acetate), poly (vinyl alcohol) and copolymers of vinyl alcohol and vinyl acetate, poly(acrylic acid) poly(methacrylic acid), polyacrylamides, polymethacrylamides, polyacrylates, polymethylmethacrylates, poly(ethylene glycol), poly(dimethyl siloxane), polyurethanes, polycarbonates, polystyrene and derivatives;

polypeptides and proteins including starch, cellulose and derivatives including ethylcellulose, methylcellulose, ethylhydroxyethylcellulose, sodium carboxymethylcellulose; collagen; gelatin; dextran and derivatives; alginates; chitin; and chitosan;

aromatic polyesters including PET, ester urethanes, epoxy including resins derived from the mono or poly-glycidyl derivative of one or more of the group of compounds consisting of aromatic diamines, aromatic monoprimary amines, aminophenols, polyhydric phenols, polyhydric alcohols, polycarboxylic acids and the like, or a mixture thereof, addition-polymerisation resins including acrylics, vinyls, bis-maleimides, and unsaturated polyesters, formaldehyde condensate resin including urea, melamine and phenols such as a formaldehyde-phenol resin, a cyanate resin, an isocyanate resin, a phenolic resin methacrylates such as methyl or glycidyl methacrylate, tri-methylene carbonate, di-methylene tri-methylene carbonate; glycolic acid, glycolide, lactic acid, lactide, p-dioxanone, dioxepanone, alkylene oxalates and caprolactones such as gamma-caprolactone;

and mixtures of two or more thereof.

Preferably $P_B$ and $P_D$ are independently selected from polystyrene, polymethylmethacrylate, polyethylene oxide, polyester such as polyglycolide, polylactide and poly(lactide-co-glycolide) and the like. PET and PEN are also particularly preferred as $P_B$ and/or $P_D$ The polymer may comprise any additional polymeric components having performance enhancing or controlling effect, for example determining the degree and nature of cross-linking, flexural and general mechanical properties.

$P_D$ may be made up of the same or different structural repeat unit(s) $P_B$. Preferably $P_D$ is the same polymer type as $P_B$.

In a preferred embodiment the additive of formula I is a $(X)_2[G_0]P_D$ additive of formula $I^0$:

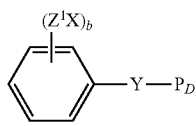
or is a $(X)_4[G_1]P_D$ additive of formula $I^1$:
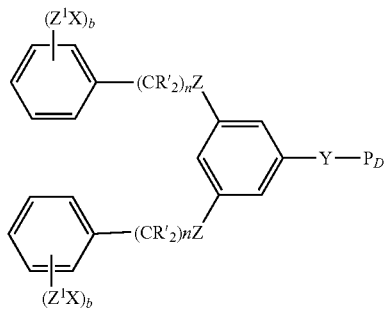
or is a $(X)_8[G_2]P_D$ additive of formula $I^2$:
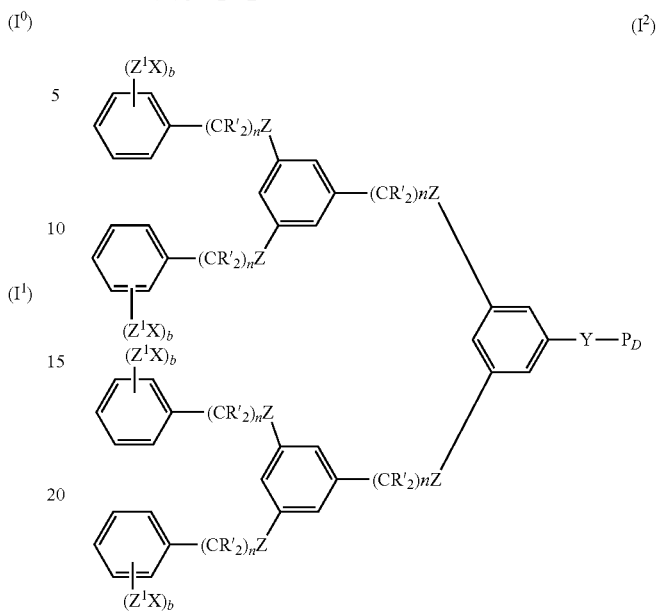
or is a $(X)_{16}[G_3]P_D$ additive of formula $I^3$:
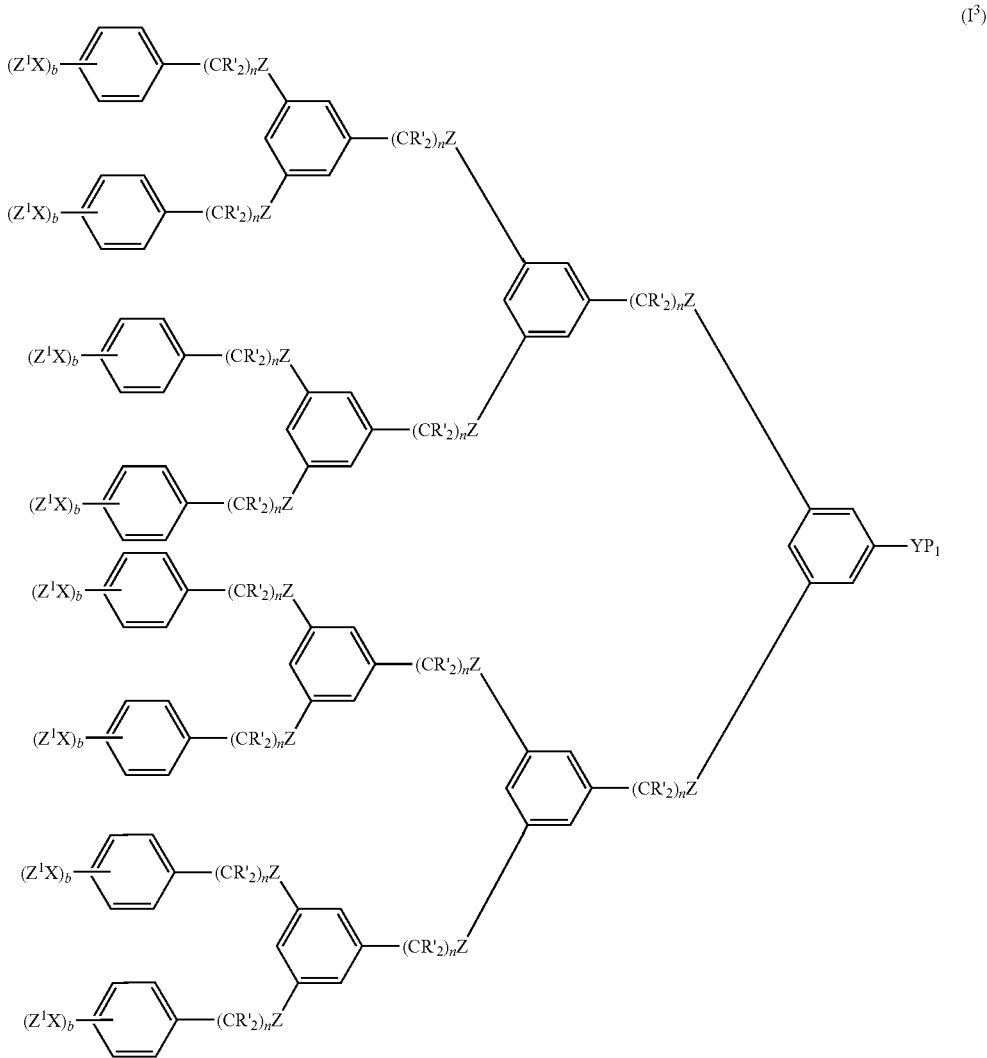

wherein $Z^1X$, b, R', n, Z, Y and $P_D$ are as hereinbefore defined.

Preferably in an additive of formula $I^0$ or $I^1$, $I^2$, $I^3$, X is $F_D$ as hereinbefore defined, more preferably is $(CR_2)m'F_D'C(F_D'')_3$ as hereinbefore defined, b is 2 or 3, groups $F_D$ are present in meta and/or para positions, Z is O and R' is H or $CH_3$.

In a further aspect of the invention there is provided a dendritic polymer additive of formula I or subformulae wherein X is $F_D$ as hereinbefore defined.

Preferably the polymer or additive is for use in applications that requires modification of the properties of a surface or interface, for example to give reduced surface energy for anti-fouling applications, improved gloss materials, oxidative resistance materials, non-stick surfaces, easy clean surfaces, hydrolysis resistant materials, process additives, die lubricants, slip agents, viscosity modifiers and the like; or in polymer processing applications as surfactants, solubilising agents, emulsion/suspension/dispersion stabilisers for applications and processes in super critical carbon dioxide ($ScCO_2$). Particularly preferred applications are given below.

In a further aspect of the invention there is provided a composition for the preparation of a polymer as hereinbefore defined comprising an amount of additive of formula I as hereinbefore defined together with an amount of bulk polymer $P_B$ or reactive monomer precursors thereof, in amount as defined.

In a further aspect of the invention there is provided a method for the preparation of a polymer as hereinbefore defined comprising combining an amount of polymer additive of formula I with an amount of a bulk polymer. The polymer is suitably obtained in fluid form as a solution, suspension, emulsion form and the like or in solid form, as granules, powder, flakes, or the like.

Preferably the polymer is shaped as a product, for example as a film, fibre, layer or monolith, independently or as a surface coating of another material or is added to a polymer to aid processing thereof. Shaping is preferably by casting, solvent casting, extrusion, filmblowing, moulding, including reaction injection moulding (RIM), and the like. Solvent casting may be with any suitable solvent as known in the art, for example toluene, THF, xylene, chloroform and the like.

Preferably the functionalised additive of formula I segregates to the surface of the shaped product spontaneously during product formation.

In a further aspect of the invention there is provided a process for the preparation of an additive of formula I, $I^0$, $I^1$, $I^2$ or $I^3$ as hereinbefore defined comprising chain growth polymerisation of precursor monomers for polymer $P_D$ together with an amount of dendron of formula II or its subformulae:

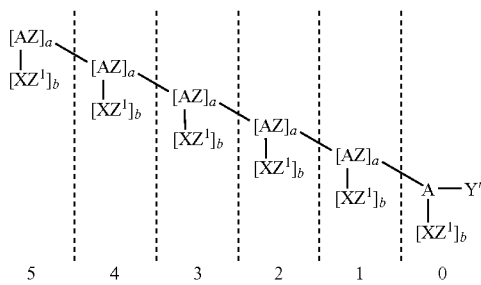

(II)

wherein values are as hereinbefore defined and Y' is a reactive group for linking to a polymer $P_D$ as hereinbefore defined, (co)initiator; or endcapping of polymer chain via a post polymerization end-capping of reactive polymer chain $QP_D$ where Q is a reactive group, with dendron of formula II or its subformulae as terminating monomer or end-capping agent; or step growth polymerization of difunctional precursor monomers with dendron of formula II or its subformulae as hereinbefore defined as an end-capping comonomer, and condensation of intermediate polymer chain and end-capped polymer chain.

Preferably a reactive dendron of formula $II^0$, $II^1$, $II^2$ or $II^3$ corresponding to formula $I^0$, $I^1$, $I^2$ or $I^3$ as hereinbefore defined with Y' in place of Y—$P_D$ is used in the process for preparing a polymer additive of formula I or subformulae.

Y' is selected according to a desired chain growth polymerisation or step growth reaction mechanism. Preferably Y' is a reactive group selected from $CH_2Br$, $CH_2OH$, $CH_2Cl$, $CH_2I$, SH, CNO, $NH_2$, NRH, COCl, COOH, more preferably is a focal group $CH_2OH$, which is suited for interconversion to other reactive focal groups Y' as hereinbefore defined.

Preferably monomers M are selected from styrene, methacrylates, acrylates, acrylamides, acrylonitrile, cyclic esters including lactones and lactides, cyclic ethers such as ethylene oxide, cyclic sulphides and cyclic siloxanes, (ring) strained cyclic olefins such as cyclooctadiene or norbornene, conjugated dienes and vinyl pyridines, polyalkylene terephthalates, polyalkylene isophthalates, polyalkylene naphthalates and copolymers thereof, each with $(CH_2)_t$ alkylene group where t is a whole number integer from 1 to 10.

Preferably a chain growth polymerisation reaction process is selected from atom transfer radical polymerisation (ATRP) (also known as metal mediated living radical polymerisation), Ring Opening Polymerisation (ROP), Anionic Ring Opening Polymerisation (AROP) or Ring Opening Metathesis Polymerisation (ROMP), for example as shown in Scheme 1:

Scheme 1

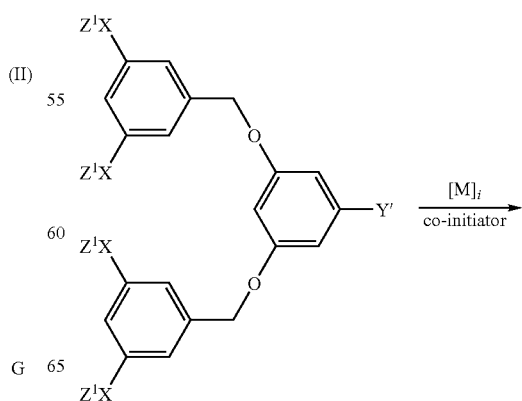

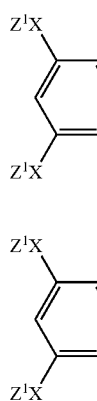

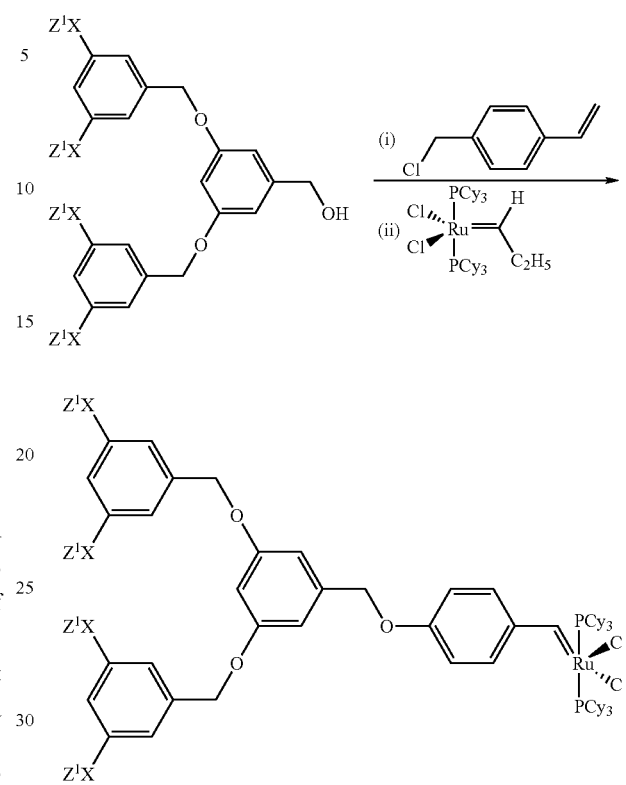

Scheme 2

For example where Y' is —CH$_2$OPhCH=Ru(PCy$_3$)Cl$_2$ (Scheme 2) and monomer M is cyclooctadiene gives P$_D$ is polybutadiene and Y is —CH$_2$OPhCH=.

Preferably a post-polymerisation end-capping reaction process is selected from end-capping of polymer synthesised by any desired mechanism for example as shown in Scheme 3 or 4, preferably from a chain growth polymerisation reaction mechanism or a step growth polymerisation reaction process, for example anionic polymerisation, AROP, ROMP and the like:

In one embodiment of a chain growth polymerisation reaction process dendron of formula II or its subformulae is a (co)initiator and the process is ATRP for example of monomers selected from styrene, methacrylates, acrylates, acrylamides, acrylonitrile and the like. For example (but not limited to) where Y' is CH$_2$Br, monomer M is styrene and co-initiator is Cu(I)Br/2,2'-dipyridyl gives P$_D$ is polystyrene, Y is CH$_2$. In a further example (but not limited to) where Y' is CH$_2$Br, monomer M is methylmethacrylate and co-initiator is Cu(I)Cl/N-(n-propyl)-2-pyridylmethanimine gives P$_D$ is polymethylmethacrylate and Y is CH$_2$.

In an alternative embodiment of a chain growth polymerisation reaction process dendron of formula II or its subformulae is a (co)initiator and the process is ROP for example of monomers selected from cyclic esters including lactones and lactides. For example (but not limited to) where Y' is CH$_2$OH, monomer M is 3,6-dimethyl-1,4-dioxane-2,5-dione (lactide) and co-initiator is tin(II) octoate gives P$_D$ is polylactide and Y is CH$_2$.

In an alternative embodiment of a chain growth polymerisation reaction process dendron of formula II or its subformulae is a (co)initiator and the process is AROP for example of monomers selected from cyclic ethers such as ethylene oxide, cyclic esters, cyclic sulphides and cyclic siloxanes. For example (but not limited to) where Y' is CH$_2$OH, monomer M is ethylene oxide and co-initiator is RK, where K is potassium and R is hydroxyl, alkoxy, alkyl, aryl gives P$_D$ is polyethylene oxide and Y is CH$_2$.

In an alternative embodiment of a chain growth polymerisation reaction process dendron of formula II or its subformulae is a (co)initiator and the process is ROMP for example of (ring) strained cyclic olefins such as cyclooctadiene or norbornene. The reaction is shown in Scheme 2:

Scheme 3

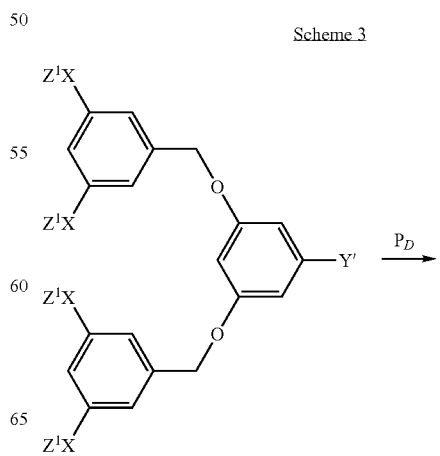

Scheme 4

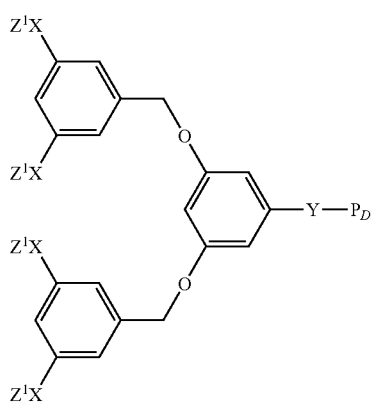

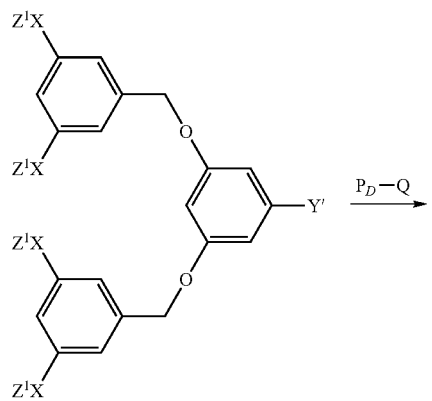

In one embodiment of a post polymerisation end-capping reaction process the process is anionic polymerisation for example of monomers selected from styrenes, methacrylates, acrylates, conjugated dienes and vinyl pyridines. For example if $P_D$ is polystyryllithium which has been end-capped with diphenylethylene, and Y' is CH$_2$Br (or Cl) gives D-Y—$P_D$ where $P_D$ is polystyrene and Y is CH$_2$C(Ph)$_2$CH$_2$. The reaction is shown in Scheme 5:

Scheme 5

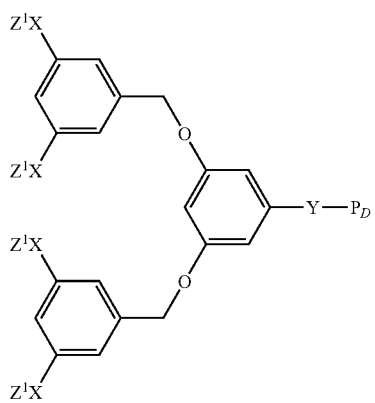

In a further embodiment of a post polymerisation end-capping reaction process the process is AROP for example of monomers selected from cyclic ether, for example ethylene oxide, cyclic esters, cyclic sulphides, cyclic siloxanes and the like. For example if $P_D$ is living polyethylene oxide and Y' is CH$_2$Br (or Cl) gives D-Y—$P_D$ where $P_D$ is polyethylene oxide and Y is CH$_2$.

In a further embodiment of a post polymerisation end-capping reaction process the process is ROMP for example of monomers selected from (ring) strained cyclic olefins for example cyclooctadiene or norbornene. For example where $P_D$ is polybutadiene (synthesised by the polymerisation of 1,5 cycloocatadiene, initiated by a molybdenum catalyst) and Y' is CHO (aldehyde) gives D-Y—$P_D$ where $P_D$ is polybutadiene and Y is CH=; or if $P_D$ is polyethylene oxide, Q is OH and Y' is CH$_2$Br (or Cl) reaction via a Williamson coupling reaction to form an ether linkage give D-Y—$P_D$ where Y is CH$_2$ and $P_D$ is polyethylene oxide; or an esterification where one of Q and Y' is an alcohol and the other of Q and Y' is a carboxylic acid (or carboxylic acid chloride); or where one of Q and Y' is an amine (NH$_2$) and the other of Q and Y' is a carboxylic acid (or carboxylic acid chloride) gives an amide linkage.

Preferably an end-capping step growth polymerisation reaction process is selected from polycondensation reactions and the like, for example as shown in Scheme 6 to 7:

Scheme 6
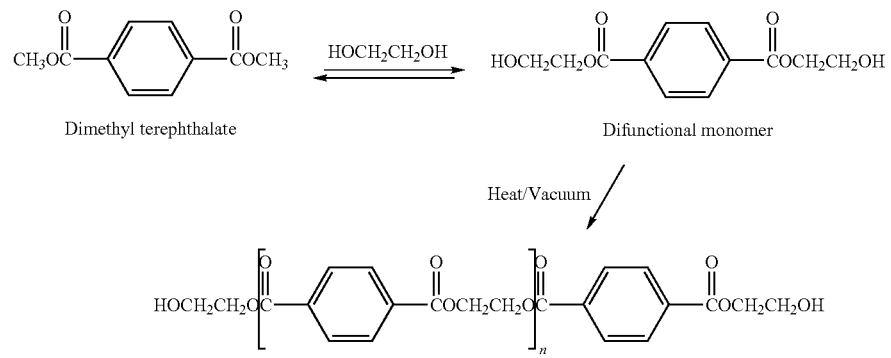
Scheme 7
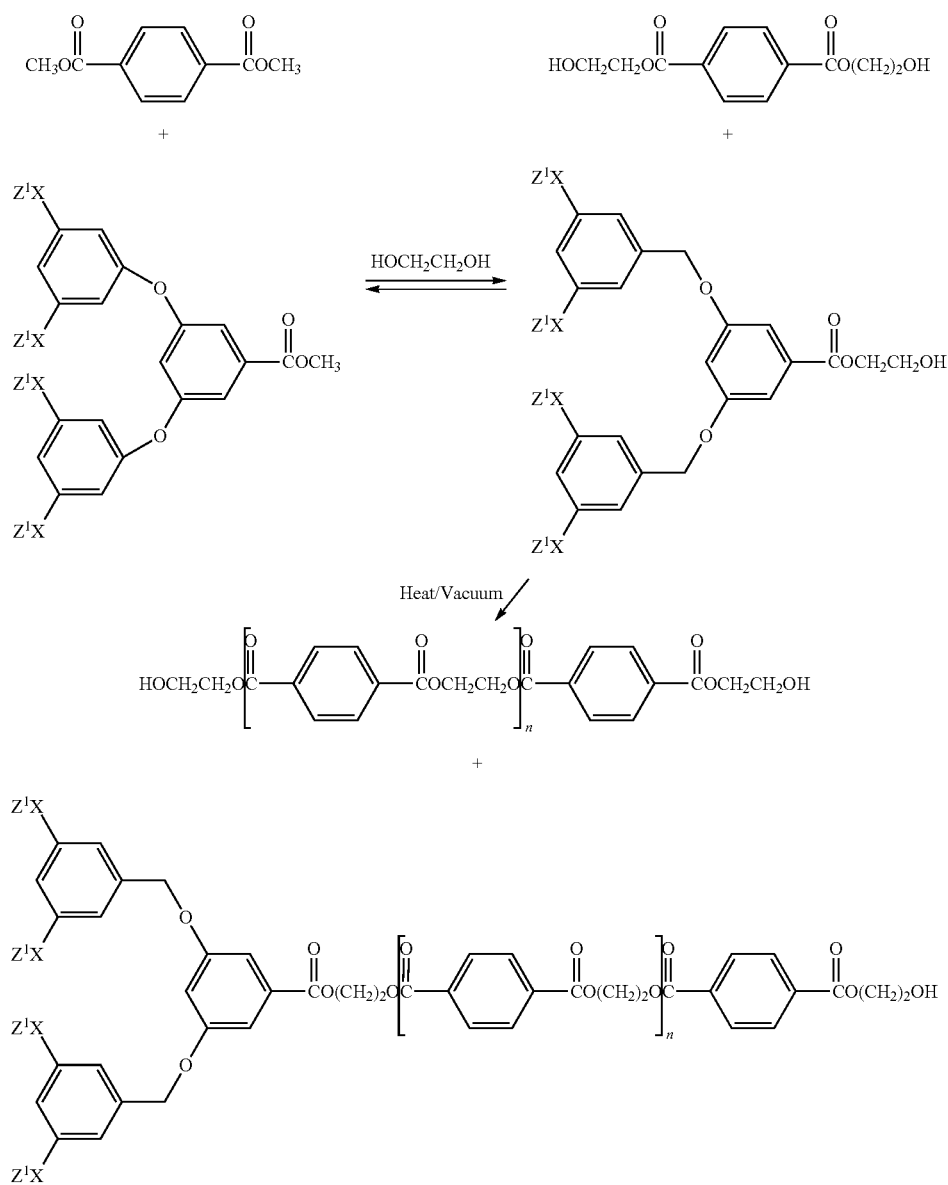

In a further aspect of the invention there is provided a process for preparing any dendron functionalised polymer by polycondensation end-capping step growth polymerisation reaction.

In one embodiment of a step growth polymerisation reaction process with end-capping during polymerisation, the reaction is a polycondensation process for example with end-capping of a ring containing polyester, such as the polyalkylene terephthalates, including polyethylene terephthalate (PET) produced in situ by transesterification of dimethylterephthalate with ethylene glycol, polyalkylene isophthalates, polyalkylene naphthalates and copolymers thereof, each with $(CH_2)_t$ alkylene group where t is a whole number integer from 1 to 10. For example if the dendron can be designed to contain the appropriate functionality it will behave as a monofunctional co-monomer and form D-Y-$P_D$ where $P_D$ is PET and Y is COO. The reaction is shown in Scheme 7; or if Y' is $NH_2$ or COCl then the dendron can be used to end-cap any of the family of aromatic polyamides; or if Y' is $(CH_2)_nNH_2$ or $(CH_2)_nCOOH$ then the dendron can be used to end-cap any of the family of aliphatic polyamides; or if Y' is OH then the dendron can be used to end-cap any of the family of polycarbonates; or if Y'NCO or $(CH_2)_nNCO$ then the dendron can be used to end-cap any of the family of polyurethanes.

Preferably the process of the invention is a chain growth polymerisation process enabling the use of the dendron of formula II in combination with any desired polymer $P_D$. Chain growth polymerisations offer a degree of control over molecule weight and polydispersity.

Preferably the method comprises the step of selecting and preparing a dendron of formula II with focal group Y' suited for reaction with a desired polymer $P_B$ which is it desired to modify, optionally including interconversion to Y' to a suitable group.

A dendron of formula II may be prepared by any route as known in the art, preferably by means of a convergent synthesis. Preferably a dendron of formula II as hereinbefore defined is prepared by:
i) the reaction of a compound of formula IV $$X\text{—Br} \qquad \qquad IV$$

with an amount of compound of formula V $$(HZ)bA(CR'_2)_n\text{—OH} \qquad \qquad V$$

to obtain a zero generation compound of formula II:

$$(XZ^1)bA(CR'_2)_n\text{—OH} \qquad \qquad II$$

and optionally to obtain a $1^{st}$ or subsequent generation dendron of formula (II);
ii) contacting with an amount of a brominating agent and converting to the corresponding bromide $$(XZ^1)bA(CR'_2)_n\text{—Br and} \qquad \qquad II$$

iii) contacting with a further amount of compound of formula V $$(HZ)bA(CR'_2)_n\text{—OH} \qquad \qquad V$$

to obtain a first generation compound of formula II $$[(XZ^1)bA(CR'_2)_nZ]_2A(CR'_2)_n\text{—OH} \qquad \qquad V$$

and in a series of iterative steps, repeating steps ii) and iii) to obtain subsequent generation product compound of formula II.

Schemes 8 and 9 show a convergent and divergent synthesis wherein Z is preferably O or is S, $Y'_a$ is preferably but not limited to $CH_2OH$. $Y'_a$ can also be $COOCH_3$, $Y'_b$ is preferably but not limited to $CH_2Br$, m and m' are whole number integer as previously defined Pg is a protecting group which is preferably but not limited to $CH_3)_3C(CH_3)_2Si$.

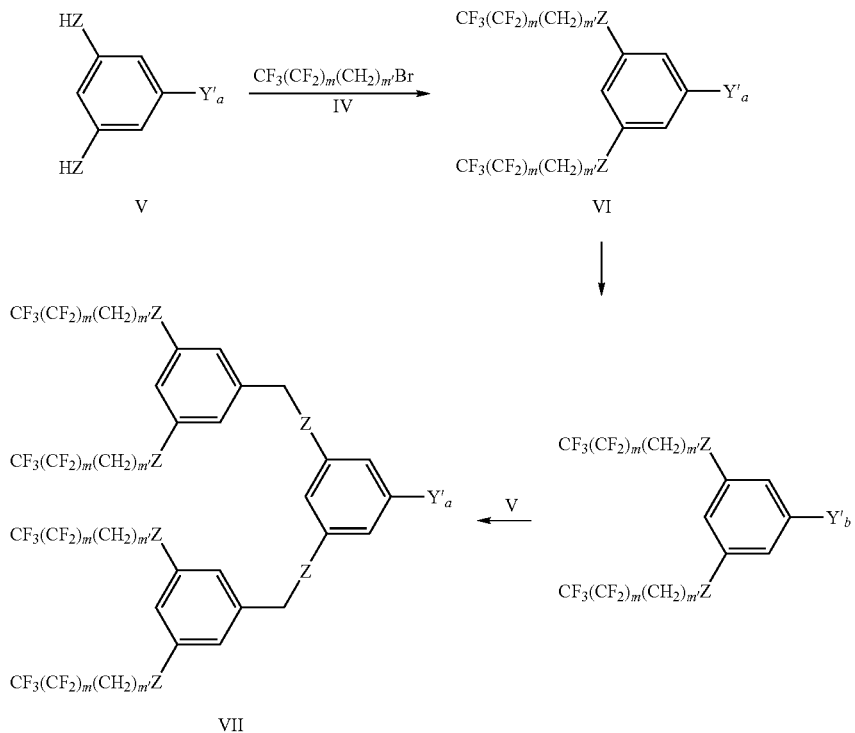

Scheme 8

Scheme 9

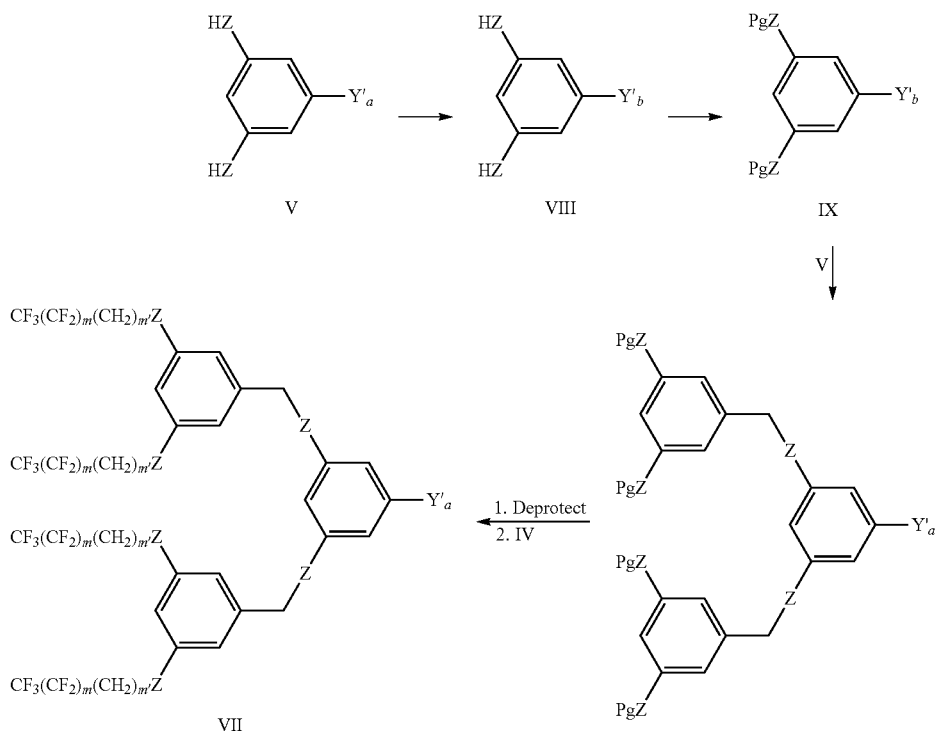

A convergent synthesis of the invention allows control of the periphery or surface of the dendron and avoids imperfections, moreover gives flexibility in selection of the core Y'. Alternatively a divergent synthesis may be used as known in the art.

In a further aspect of the invention, there is provided a kit comprising a dendron of formula II together with reagents for interconversion of group Y' for reaction with a desired polymer $P_B$.

The class of polymer and blends thereof provide a range of different surface- or interface-stabilisation effects and polymer processing effects, leading to improvements in a range of applications.

In a further aspect of the invention there is provided a surface or interface stabilising aid including an anti-foulant, improved gloss material, oxidative resistance material, non-stick surface, easy clean surface, hydrolysis resistant material, process additive, die lubricant, slip agent, viscosity modifier or the like; or a polymer processing aid including a surfactant, solubilising agent or emulsion/suspension/dispersion stabiliser for applications and processes in super critical carbon dioxide ($ScCO_2$) comprising polymer as a blend- or copolymer as hereinbefore defined, or comprising additive of formula I as hereinbefore defined; and other applications including the additive for improved barrier properties, as an oxygen/water/carbon dioxide scavenger, as a reactive additive for reactive blending, or polymer blend-compatibiliser, as an adhesive coupling agent, a multifunctional polymerisation initiator, as a functional polymer for conjugation to medicinal drugs or other biological moiety, as an antioxidant, as a wetting agent, as a mould release agent, an antistatic agent, as flame retardants, ultraviolet stabilisers, as a functional polymer for conjugation to a chromophore/luminophore, as a multisite catalyst, as a biocide or as a crosslinking agent.

In a further aspect there is provided a blend or additive as hereinbefore defined for use in stabilising surfaces or interfaces, reduced surface energy for anti-fouling applications, improved gloss materials, oxidative resistance materials, non-stick surfaces, easy clean surfaces, hydrolysis resistant materials, process additives, die lubricants, slip agents, viscosity modifiers and the like; or in polymer processing as surfactant, solubilising agent or emulsion/suspension/dispersion stabiliser for applications and processes in super critical carbon dioxide ($ScCO_2$); and other applications including additive for improved barrier properties, as an oxygen/water/carbon dioxide scavenger, as a reactive additive for reactive blending, or polymer blend-compatibiliser, as an adhesive coupling agent, a multifunctional polymerisation initiator, as a functional polymer for conjugation to medicinal drugs or other biological moiety, as an antioxidant, as a wetting agent, as a mould release agent, an antistatic agent, as flame retardants, ultraviolet stabilisers, as a functional polymer for conjugation to a chromophore/luminophore, as a multisite catalyst, as a biocide or as a crosslinking agent.

The use of the polymer blend or additives of the invention in anti fouling, or foul release, applications is a particularly preferred aspect of the present invention. These are essentially two distinct approaches that may be taken to retain "clean surfaces". Anti fouling is the prevention of fouling; fouling release is the easy removal of fouling, usually either by hydrodynamic forces generated by a vessel as it travels through the ocean or by cleaning.

Current technology for anti fouling coatings often relies on formulations that contain and release metals such as tin, copper and zinc into the environment. However whilst very effective in controlling the degree of fouling, the use of such polluting strategies is unsustainable and phasing out of such coating formulations has begun. The use of butyl tin additives has already been banned and the use of other metals is likely to be subject to legislation in the near future. Alternative strategies for the control of biofouling are required. It appears that whilst having a low surface energy is vital for a successful foul release strategy, anti fouling is a more complex problem. The mechanism of bio fouling is a multifaceted issue requiring more than just hydrophobicity. It has been established that the first step in fouling by marine organisms involves secretion of a glycoprotein which may be of either hydrophobic or hydrophilic nature, depending on the fouling species. The protein provides for binding to the surface through various modes of interaction, including chemical bonding, electrostatic interaction, diffusion and mechanical interlocking. It is therefore imperative that any coating formulated for preventing both hard and soft fouling can simultaneously defeat all the modes of interaction between the fouling organism and the surface.

Although chemical and electrostatic interactions may be minimised by morphological and compositionally heterogeneous surface patterns, the diffusion and mechanical interlocking modes of attraction may be limited by topological complexities at the surface coupled with the necessary mechanical integrity of the coating. Molecular-level topology has also been demonstrated to be an important parameter in providing control over protein adsorption.

Therefore in anti fouling applications such as coatings formulations and ultra (micro and nano) filtration units, a hydrophilic surface or in may cases a balance of hydrophobicity/hydrophilicity and surface roughness will be optimal at preventing bioadhesion and therefore minimising bio fouling by water borne organisms. The present invention allows for the use of additives containing both hydrophobic (fluoroalkyl) and/or hydrophilic (PEG) groups and as such is very suitable for tailoring the degree of hydrophobicity/hydrophilicity at a given surface to optimise anti fouling properties.

Turning to foul release it is a well-established technology that surface coatings containing low surface energy additives such as PTFE can be effective in foul release applications, for example in yacht paint. The additives in such coatings can result in easy clean surfaces when applied to relatively fast moving vessels. As the vessel moves through the water the friction generated between water and vessel is sufficient to detach aqueous fouling organisms. Alternatively washing the hull of treated vessels with high pressure water jets can also result in foul release. In the present invention, additives containing multiple fluoroalkyl groups have been shown to generate PTFE like surfaces when added to a bulk in relatively low concentrations and as such would be particularly suitable as efficient additives for foul release surface coatings. Foul release coatings with low surface energies are very effective in certain applications but are far from a panacea.

A further preferred application of the polymer blend or additives of the invention is their use as and in hydrolysis-resistant materials. Polylactides and other aliphatic polyesters are not only biocompatible but also biodegradable and bioresorbable and as such have found many uses in in vivo applications, e.g. degradable sutures and scaffolds for tissue repair. The primary mechanism for the (bio)degradation of these implants is hydrolysis. The ability to tailor the surface properties of such implants with respect to hydrophilicity/hydrophobicity will result in the ability to control the rate of hydrolysis and therefore manage the lifetime of implants. In the present invention polylactide additives containing multiple fluoroalkyl groups have been shown to result in surfaces with increased contact angles with water and therefore greater hydrophobicity. Implants containing such additives would be expected to have resistance to hydrolysis, inhibited biodegradation and therefore extended in vivo lifetimes.

A further preferred application of the polymer blend or additives of the invention is their use as hydrophilic surfaces for enhanced wettability. There are numerous materials for various applications that would benefit from having a more hydrophilic surface. For example, many polymer films are relatively hydrophobic e.g. PET and the application of aqueous based surface coatings or printing onto such hydrophobic polymer films is often preceded by a costly surface treatment to render the surface more hydrophilic or wettable. In the present invention the addition of additives containing multiple polar groups such as COOH or hydrophilic groups such as poly(oligo)ethylene glycol to the bulk polymer, followed by annealing in a polar environment has been shown to result in migration of such additives to the air/polymer surface. The presence of such functionalities at a surface leads to enhanced hydrophilicity and more wettable surfaces, thereby allowing the application of coatings or printing directly onto the film surface.

A further preferred application of the polymer blend or additives of the invention is their use as and in materials having barrier properties—In many applications the barrier properties of polymers are crucial. For example in the emerging flexible electronics industry the polymeric substrate of choice is either polyethylene terephthalate (PET) or polyethylene naphthalate (PEN). However the relatively high permeability of these polyesters to oxygen results in very short lifetimes for the resulting devices and needs to be addressed to deliver these products to market. Existing strategies for overcoming this problem usually rely on having multilayered (up to 15 layers) hybrid organic/inorganic films, however these structures are expensive to make and create new problems relating to the adhesion of so many layers and differential deformation on bending of the various layers.

An alternative approach is to improve the oxygen barrier properties! Polydienes such as polybutadiene are well known to be subject to oxidative degradation and as such can be used as oxygen scavengers. The addition of additives of PET end functionalised with multiple (oligo)polybutadiene groups to bulk PET film will result in improved barrier properties with respect to oxygen permeation. Furthermore, PET is a semi-crystalline polymer and diffusion of small molecules such as oxygen through semi-crystalline polymers is known to proceed through the low density amorphous regions. The bulky nature of the oligobutadiene head groups of the PET additives will prevent them from sitting in a crystalline domain and as such these additives will passively target the oxygen scavenging functionality in the amorphous regions through which oxygen diffuses, further enhancing the effect. Incorporation of such oxygen scavenging additives will improve the barrier properties of PET (or PEN) thereby allowing the use of films of fewer layers and products of extended lifetimes.

The invention is now illustrated in non-limiting manner with reference to the following examples wherein the properties of the surface are characterised by contact angle measurements, or $^3$He nuclear reaction analysis (NRA), the structure of the film is typically characterised by ion beam analysis (IBA), secondary ionisation mass spectroscopy (SIMS), X ray reflectometry or neutron reflectivity. Surface energy is evaluated by contact angle measurements with water and dodecane.

A—Preparation of Dendrons of Formula II
EXAMPLES A1-A9
Fréchet-Type Polyarylether Dendritic Wedges with Peripheral Fluorocarbon (A1-A9) and Ester (A10) and PEG (A11-12) Groups
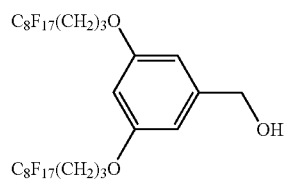
A1
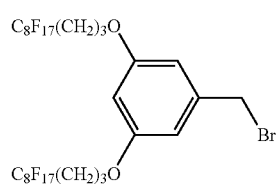
A2
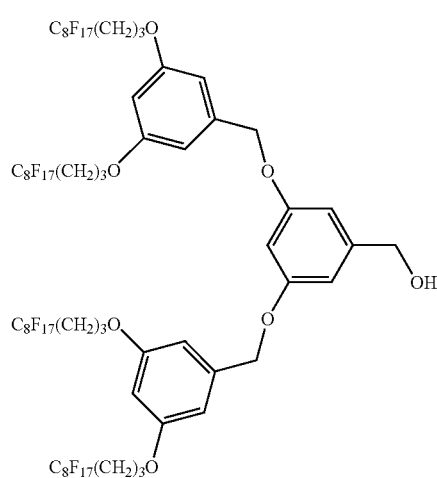
A3
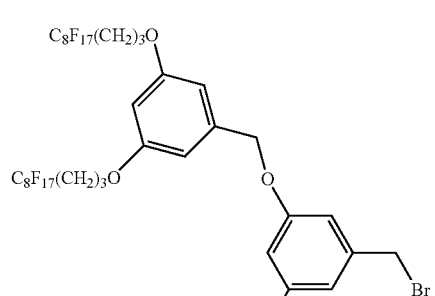
A4
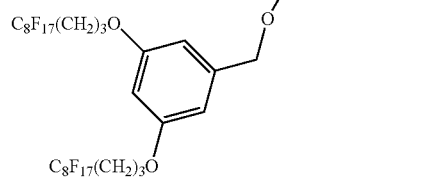
-continued
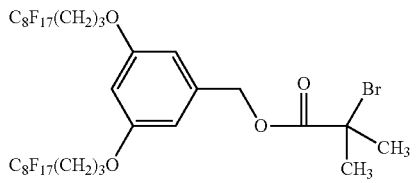
A5
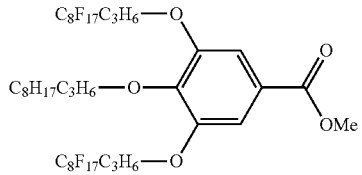
A6
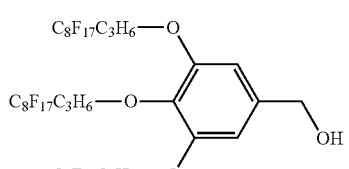
A7
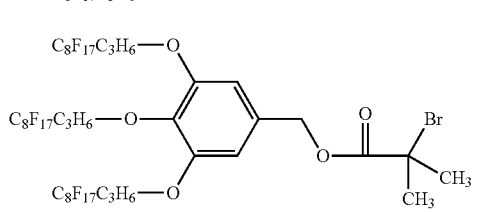
A8
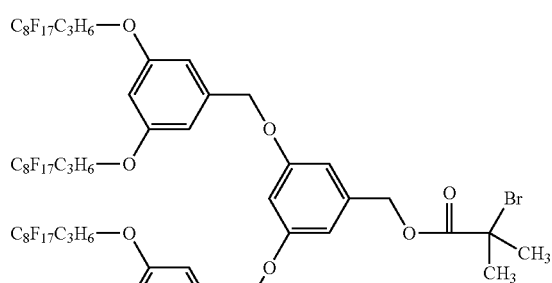
A9
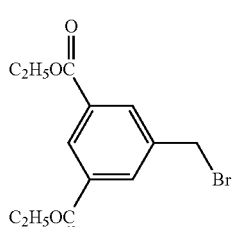
A10
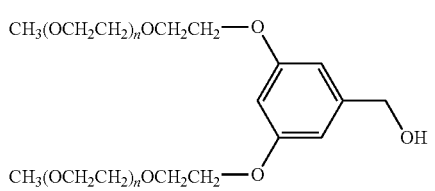
A11

-continued

A12

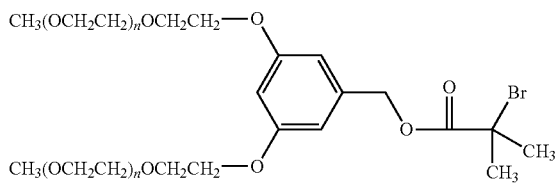

General Synthetic Procedures

The following generic synthetic procedures have been employed:

1. Williamson Coupling Reactions

A mixture of the appropriate benzyl or alkyl bromide, 3,5-dihydroxybenzyl alcohol (Aldrich, 99%), potassium carbonate (Aldrich, 99.995%), 18-crown-6 (Aldrich, 99%) and dry acetone were charged in a 2-neck round bottom flask which was prior flushed with nitrogen. The mixture was stirred vigorously and refluxed under nitrogen for 6-48 hours. The reaction mixture was then allowed to cool and filtered to remove the salt. The solution was evaporated to dryness, dissolved in $CH_2Cl_2$ or ether, and washed with water. The water layer was extracted twice with more organic solvent and the combined extracts were dried over magnesium sulfate, filtered and dried under reduced pressure. Further purification by column chromatography or recrystallisation was performed.

2. Bromination Reactions

The benzyl or alkyl alcohol was dissolved in a minimum dry tetrahydrofuran/dichloromethane in a 2-neck round bottom flask fitted with a nitrogen supply. Carbon tetrabromide (Aldrich, 99%) was added followed by the slow addition of triphenylphosphine (Aldrich, 99%) in 4 aliquots. The reaction mixture was stirred at room temperature under nitrogen. Sometimes a dark coloration is observed upon the final addition of $PPh_3$. In these cases, the reaction was quenched with water to avoid the formation of side products. Otherwise, the reaction progress was monitored by NMR and quenched with water upon full conversion. The reaction mixture was then evaporated to dryness, dissolved in $CH_2Cl_2$ and washed with water. The water layer was extracted twice with more organic solvent and the combined extracts were dried over magnesium sulfate, filtered and dried under reduced pressure. Further purification by column chromatography or recrystallisation was performed.

Note: $G_0, G_1, G_2 \ldots$ = generation 0, generation 1, generation 2 . . . .

3,5(di-3-perfluorooctyl)propyloxy)benzylbromide-($C_8F_{17}(CH_2)_3O)_2$-[$G_0$]-Br (A2)

3-(perfluorooctyl)propyl bromide

Prepared from 3-(perfluorooctyl)propanol (Fluorochem) (22.5 g, 47.1 mmol), $CBr_4$ (27.1 g, 81.7 mmol) and $PPh_3$ (21.1 g, 80.3 mmol). The fluoroalcohol and $CBr_4$ were initially dissolved in a mixture of $THF/CH_2Cl_2$ (1:2) and $PPh_3$ similarly dissolved was added dropwise over 6 hours. Addition of $PPh_3$ was done at 0° C. and the reaction was left at ambient temperature overnight. The product was extracted from $CH_2Cl_2$ and water as usual. The mixture obtained was dropped into a large volume hexane to precipitate triphenylphosphine oxide, filtered and dried under reduced pressure. This was repeated twice and the final mixture was distilled under reduced pressure.

Yield 18.2 g (71.8%). (Found: C, 23.92; H, 1.08; F, 58.07; Br, 14.15. Calculated: C, 24.42; H, 1.12; F, 59.69; Br, 14.77)

$\delta_H$(CDCl$_3$) 2.19 (m, 2H, CH$_2$CH$_2$CH$_2$), 2.29 (m, 2H, CH$_2$CF$_2$), 3.47 (t, 2H, J 6.00 Hz, CH$_2$O).

3,5(di-3-(perfluorooctyl)propyloxy)benzylalcohol ($C_8F_{17}(CH_2)_3O)_2$-[$G_0$]-OH (A1)

Prepared by Williamson coupling reaction from 3-(perfluorooctyl)propyl bromide (15.0 g, 27.7 mmol), 3,5-dihydroxybenzyl alcohol (1.84 g, 13.1 mmol), $K_2CO_3$ (4.61 g, 33.4 mmol) and 18-crown-6 (0.70 g, 2.64 mmol). Reaction stopped after 27 hours. The product was recrystallised from methanol. White crystals obtained.

Yield 8.20 g (58.3%). (Found: C, 32.58; H, 1.68; F, 60.08. Calculated: C, 32.85; H, 1.71; F, 60.91)

$\delta_H$(CDCl$_3$) 1.56 (s, 1H, OH), 2.10 (m, 4H, CH$_2$CH$_2$CH$_2$), 2.31 (m, 4H, CH$_2$CF$_2$), 4.03 (t, 4H, J=6.00 Hz, CH$_2$O), 4.64 (s, 2H, CH$_2$OH), 6.37 (t, 1H, J 2.00 Hz, ArH) and 6.53 (d, 2H, J 2.00 Hz, ArH).

3,5(di-3-(perfluorooctyl)propyloxy)benzylbromide ($C_8F_{17}(CH_2)_3O)_2$-[$G_0$]-Br (A2)

Prepared by bromination of 3,5(di-3-(perfluorooctyl)propyloxy)benzylalcohol (A1) (5.00 g, 4.72 mmol), $CBr_4$ (3.10 g, 9.34 mmol) and $PPh_3$ (2.45 g, 9.34 mmol). Reaction was stirred for 24 hours. The product was recrystallised from ethanol to give a fine white powder.

Yield 4.2 g (79.2%). (Found: C, 31.03; H, 1.50; F, 57.32; Br, 6.97. Calculated: C, 31.01; H, 1.53; F, 57.50; Br, 7.11).

$\delta_H$(CDCl$_3$) 2.10 (m, 4H, CH$_2$CH$_2$CH$_2$), 2.30 (m, 4H, CH$_2$CF$_2$), 4.02 (t, 4H, J 6.00 Hz, CH$_2$O), 4.41 (s, 2H, CH$_2$Br), 6.38 (t, 1H, J 2.00 Hz, ArH) and 6.54 (d, 2H, J 2.00 Hz, ArH).

di[3,5(di-3-perfluorooctyl)propyloxy)benzyloxy] benzylbromide-($C_8F_{17}(CH_2)_3O)_4$-[$G_1$]-Br (A4)

($C_8F_{17}(CH_2)_3O)_4$-[$G_1$]-OH (A3)

Prepared by Williamson coupling reaction from 3,5(di-3-(perfluorooctyl)propyloxy)benzylbromide (A2) (3.8 g, 3.38 mmol), 3,5-dihydroxybenzyl alcohol (0.231 g, 1.65 mmol), $K_2CO_3$ (0.730 g, 5.27 mmol) and 18-crown-6 (0.040 g, 0.149 mmol). Reaction was stopped after 24 hours. The product was recrystallised from ethanol. White crystals obtained.

Yield 1.45 g (39.5%). (Found: C, 34.99; H, 1.79; F, 57.79. Calculated: C, 35.09; H, 1.81; F, 58.06).

$\delta_H$(CDCl$_3$) 1.55 (s, 1H, OH), 2.09 (m, 8H, CH$_2$CH$_2$CH$_2$), 2.25 (m, 8H, CH$_2$CF$_2$), 4.03 (t, 8H, J 5.60 Hz, CH$_2$CH$_2$O), 4.64 (s, 2H, CH$_2$OH), 4.97 (s, 4H, CCH$_2$O), 6.39 (t, 2H, J 2.00 Hz, ArH), 6.51 (t, 1H, J 2.40 Hz, ArH), 6.57 (d, 4H, J 2.00 Hz, ArH), 6.61 (d, 2H, J 2.40 Hz, ArH).

($C_8F_{17}(CH_2)_3O)_4$-[$G_1$]-Br (A4)

Prepared from ($C_8F_{17}(CH_2)_3O)_4$-[$G_1$]-OH (A3) (1.20 g, 0.540 mmol), $CBr_4$ (0.360 g, 1.08 mmol) and $PPh_3$ (0.280 g, 1.08 mmol). Reaction was left for 24 hours. Product was recrystallised from a 1:1 mixture of THF and methanol to give white crystals.

Yield 0.55 g (44.7%). (Found: C, 34.07; H, 1.71; F, 56.69; Br, 3.22. Calculated: C, 34.13; H, 1.72; F, 56.47; Br, 3.49).

$\delta_H$(CDCl$_3$) 2.09 (m, 8H, CH$_2$CH$_2$CH$_2$), 2.28 (m, 8H, CH$_2$CF$_2$), 4.03 (t, 8H, J 5.80 Hz, CH$_2$CH$_2$O), 4.41 (s, 2H, $CH_2Br$), 4.97 (s, 4H, $CCH_2O$), 6.40 (t, 2H, J 2.00 Hz, ArH), 6.47 (t, 1H, J 2.00 Hz, ArH), 6.57 (d, 4H, J 2.00 Hz, ArH), 6.64 (d, 2H, J 2.00 Hz, ArH).

3,5-(Di-3-(perfluorooctyl)propyloxy)benzyl-2-bromo-2-methylpropanoate ($C_8F_{17}(CH_2)_3O)_2$-[$G_0$]-OCOC($CH_3)_2Br$ (A5)

Compound A1 (2.00 g, 1.89 mmol) was dissolved in dry THF (30 mL) and dried triethyl amine (0.29 mL, 2.08 mmol) was added to the solution. 2-bromoisobutyryl bromide (0.25 mL, 2.02 mmol) was added dropwise to the mixture with stirring. The mixture was allowed to react at ambient temperature for 24 hours. The product was isolated by filtering off the salt formed and evaporating the solvent. The latter was dissolved in $CH_2Cl_2$, washed twice with saturated $NaHCO_3$ solution followed by two $H_2O$ washes. The organic layer was separated and dried over anhydrous $MgSO_4$. After filtration and removal of solvent, the crude product was recrystallized from hexane to afford the product A5 as fine white crystals (1.75 g, 76.8%). mp 59-60° C. $^1$H NMR (400 MHz, $CDCl_3$, δ, ppm) 1.96 (s, 6H, C($CH_3)_2$), 2.05 (m, 4H, $CH_2CH_2CH_2$), 2.28 (m, 4H, $CH_2CF_2$), 4.03 (t, 4H, J 6.0 Hz, $CH_2CH_2O$), 5.15 (s, 2H, $CH_2OCO$), 6.41 (t, 1H, J 2.0 Hz, ArH), 6.53 (d, 2H, J 2.0 Hz, ArH). $^{13}$C NMR (100 MHz, $CDCl_3$, δ, ppm) 20.9 (2C, $CH_2CH_2CH_2$), 28.4 (t, 2C, J 22.0 Hz, $CF_2CH_2$), 31.2 (2C, C($CH_3)_2$), 56.1 (1C, C($CH_3)_2$), 66.9 (2C, $CH_2CH_2O$), 67.6 (1C, $CH_2OCO$), 101.8 (1C, ArCH), 106.7 (2C, ArCH), 138.4 (1C, ArC$CH_2O$), 160.3 (2C, ArCO), 171.8 (1C, $CH_2OCO$). Anal. Calcd for $C_{33}H_{23}BrF_{34}O_4$: C, 32.77; H, 1.92; Br, 6.61; F, 53.41. Found: C, 32.80; H, 1.88; Br, 6.68; F, 52.75.

Methyl-3,4,5-(tri-3-(perfluorooctyl)propyloxy)benzoate. ($C_8F_{17}(CH_2)_3O)_3$-[$G_0$]-$CO_2CH_3$ (A6)

Compound A6 was prepared from a mixture of 3-(perfluorooctyl)propyl bromide (10.0 g, 18.5 mmol), 3,4,5-trihydroxybenzoate (1.08 g, 5.89 mmol), $K_2CO_3$ (3.10 g, 22.4 mmol) and 18-crown-6 (0.469 g, 1.77 mmol) in dry acetone (30 mL) by following the procedure used for compound A1. The reaction mixture was worked up as in A1 and the crude product was recrystallized from acetone to afford the product A6 as white crystals (6.81 g, 73.8%). mp 88-89° C. $^1$H NMR (400 MHz, $CDCl_3$, δ, ppm) 2.04 (m, 2H, $CH_2CH_2CH_2$), 2.14 (m, 4H, $CH_2CH_2CH_2$), 2.32 (m, 6H, $CH_2CF_2$), 3.91 (s, 3H, $OCH_3$), 4.06 (t, 2H, J 6.0 Hz, $CH_2O$), 4.12 (t, 4H, J 6.0 Hz, $CH_2O$), 7.28 (s, 2H, ArH).

3,4,5-(Tri-3-(perfluorooctyl)propyloxy)benzyl alcohol ($C_8F_{17}(CH_2)_3O)_3$-[$G_0$]-OH (A7)

A solution of A6 (1.50 g, 0.959 mmol) in dry THF (20 mL) was added dropwise to a suspension of lithium aluminum hydride (0.049 g, 1.30 mmol) in THF (1.3 mL). The mixture was refluxed under a $N_2$ atmosphere for 1 hour, left to cool and NaOH (1M, 1 mL) was added. The mixture was filtered, evaporated to dryness and recrystallised from acetone to give A7 as white crystals (1.10 g, 74.8%). $^1$H NMR (400 MHz, $CDCl_3$, δ, ppm) 1.66 (s, 1H, OH), 2.01 (m, 2H, $CH_2CH_2CH_2$), 2.11 (m, 4H, $CH_2CH_2CH_2$), 2.30 (m, 6H, $CH_2CF_2$), 3.98 (t, 2H, J=6.0 Hz, $CH_2O$), 4.08 (t, 4H, J 6.0 Hz, $CH_2O$), 4.62 (s, 2H, $CH_2OH$), 6.60 (s, 2H, ArH).

3,4,5-(Tri-3-(perfluorooctyl)propyloxy)benzyl-2-bromo-2-methylpropanoate ($C_8F_{17}(CH_2)_3O)_3$-[$G_0$]-OCOC($CH_3)_2Br$ (A8)

Compound A8 was prepared from A7 (0.60 g, 0.391 mmol), triethylamine (0.075 mL, 0.538 mmol) and 2-bromoisobutyryl bromide (0.070 mL, 0.568 mmol) in dry THF (10 mL) by following the procedure used for compound A5. The reaction was left for 35 hours and the mixture was worked up as in A5 except that EtOAc was used instead of $CH_2Cl_2$ as solvent. The crude product was recrystallized from $CH_2Cl_2$ to afford A8 as a white powder (0.40 g, 60.7%). $^1$H NMR (400 MHz, $CDCl_3$, δ, ppm) 1.96 (s, 6H, C($CH_3)_2$), 2.02 (m, 2H, $CH_2CH_2CH_2$), 2.12 (m, 4H, $CH_2CH_2CH_2$), 2.32 (m, 6H, $CH_2CF_2$), 3.99 (t, 2H, J 6.0 Hz, $CH_2O$), 4.07 (t, 4H, J 6.0 Hz, $CH_2O$), 5.13 (s, 2H, $CH_2OCO$), 6.60 (s, 2H, ArH).

($C_8F_{17}(CH_2)_3O)_4$-[$G_1$]-OCOC($CH_3)_2Br$ (A9)

Compound A9 was prepared from A3 (2.00 g, 0.899 mmol), triethyl amine (0.14 mL, 0.992 mmol) and 2-bromoisobutyryl bromide (0.12 mL, 0.992 mmol) in dry THF (30 mL) by following the procedure used for compound A5. The reaction was left for 40 hours and the mixture was worked up as in A5 except that EtOAc was used instead of $CH_2Cl_2$ as solvent. The crude product was recrystallized from $CH_2Cl_2$ to afford A9 as a white powder (1.34 g, 62.9%). $^1$H NMR (400 MHz, $CDCl_3$, δ, ppm) 2.09 (m, 8H, $CH_2CH_2CH_2$), 2.30 (m, 8H, $CH_2CF_2$), 4.02 (t, 8H, J=6.0 Hz, $CH_2CH_2O$), 4.97 (s, 4H, $CCH_2O$), 5.14 (s, 2H, $CH_2OCO$), 6.40 (t, 2H, J=2.0 Hz, $Ar_2H$), 6.54 (t, 1H, J 2.0 Hz, $Ar_1H$), 6.57 (d, 4H, J 2.0 Hz, $Ar_2H$), 6.60 (d, 2H, J 2.0 Hz, $Ar_1H$). $^{13}$C NMR (100 MHz, $CDCl_3$, δ, ppm) 20.8 (4C, $CH_2CH_2CH_2$), 28.2 (t, 4C, J 22.0 Hz, $CF_2CH_2$), 31.0 (2C, C($CH_3)_2$), 57.0 (1C, C($CH_3)_2$), 66.7 (4C, $CH_2CH_2O$), 67.4 (1C, $CH_2OCO$), 70.2 (2C, $CCH_2O$), 101.2 (2C, $Ar_2CH$), 102.4 (1C, $Ar_1CH$), 106.2 (4C, $Ar_2CH$), 106.9 (2C, $Ar_1CH$), 138.2 (1C, $Ar_1CCH_2O$), 139.6 (2C, $Ar_2CCH_2O$), 160.2 (2C, $Ar_1CO$), 160.3 (4C, $Ar_2CO$), 172.0 (1C, $CH_2OCO$). Anal. Calcd for $C_{69}H_{45}BrF_{68}O_8$: C, 34.91; H, 1.91; Br, 3.37; F, 54.42. Found: C, 34.84; H, 1.81; Br, 3.37; F, 53.64.

Diethyl 5-(Bromomethyl)isophthalate (A10)

Diethyl 5-(hydroxymethyl)isophthalate (2.50 g, 9.91 mmol) was dissolved in dry THF (15 mL) at 0° C. in a two necked round bottom flask fitted with an $N_2$ inlet. $PBr_3$ (0.70 mL, 7.20 mmol) was added slowly to the stirring solution via a syringe. $CH_2Cl_2$ (2.5 mL) was then added and the solution was left to stir overnight at 0° C. The volume of solvent was reduced under a rotary evaporator and absolute ethanol (2 mL) was added. The solution was left in the freezer overnight to yield white crystals which were filtered, washed with methanol and dried in a vacuum oven. Brilliant white plate crystals were obtained (2.30 g, 73.0%). mp 111-113° C. $^1$H NMR (400 MHz, $CDCl_3$, δ, ppm) 1.40 (t, 6H, J 7.1 Hz, $CH_3$), 4.40 (q, 4H, J 7.0 Hz, $OCH_2$), 4.54 (s, 2H, $CH_2Br$), 8.23 (s, 2H, ArH), 8.59 (s, 1H, ArH). Anal. Calcd for $C_{13}H_{15}BrO_4$: C, 49.54; H, 4.80; Br, 25.35. Found: C, 49.47; H, 4.78; Br, 24.81.

$(PEG)_2$-[$G_0$]-OH (A11)

Prepared by the Williamson coupling reaction between α-chloro-polyethylene glycol methyl ether (PEG-Cl) and 3,5-dihydroxybenzyl alcohol. PEG-Cl, $M_n$ 550 gmol$^{-1}$ (15 g, 27.3 mmol), 3,5-dihydroxybenzyl alcohol (1.84 g, 13.1 mmol), potassium carbonate (4.60 g, 33.3 mmol) and 18-crown-6 (0.7 g, 2.64 mmol) are stirred vigorously under reflux in dry acetone for 48 hours. The reaction mixture is then cooled and filtered to remove the salt and the solution evaporated to dryness. The product is purified by column chromatography.

$$(PEG)_2\text{-}[G_0]\text{-}OCOC(CH_3)_2Br \quad (A12)$$

A12 is prepared from A11 according to the method described for A5.

B—Preparation of Additives of Formula I

Examples B1 to B5 were made according to the following:

Materials

Styrene-$d_8$ (Cambridge Isotope Laboratories, 98%) was not purified before use. Methyl methacrylate (Aldrich, 99%) was passed over a short column of basic alumina to remove acid impurities and inhibitors before polymerizations. D,L lactide (Aldrich) was recrystallised twice from toluene and kept under an inert atmosphere. Copper (I) bromide (Aldrich, 99.999%), Cu(I)Cl (Aldrich, 99.996%), N-(n-propyl)-2-pyridylmethanimine (Warwick Effect Polymers UK) and 2,2'-dipyridyl (Aldrich, 99%) were used as obtained. Tin(II) octoate (Aldrich) was dissolved in benzene and the stock solution was degassed and kept under a nitrogen atmosphere.

EXAMPLES B1-B3

Synthesis of poly(styrene-$d_8$) from dendrons A2 and A4

Poly(styrene-$d_8$) was prepared by copper mediated living radical polymerisation using the brominated dendrons A2 and A4 of Formula II as initiator. All reactions were carried out using standard Schlenk techniques under a nitrogen atmosphere. The synthesis of B1 is described below:

Cu(I)Br (0.036 g, 0.25 mmol), A2 (0.281 g, 0.25 mmol) and 2,2'-dipyridyl (0.078 g, 0.50 mmol) were placed together with a magnetic stirrer bar in an oven-dried Schlenk tube. The tube was fitted with a rubber septum and pump filled with nitrogen three times. Styrene-$d_8$ was degassed by bubbling nitrogen through it for at least 30 minutes before polymerisation and then transferred (2.55 mL, 22.3 mmol) to the Schlenk tube via syringe. The solution was further degassed by three freeze-pump-thaw cycles. The tube was then lowered in a thermostatically controlled oil-bath at 110° C. and left for 18 hours under nitrogen. Purification was achieved by allowing the solution to cool, diluting in toluene and passing through a column of aluminium oxide. The solution collected was concentrated and the polymer precipitated in methanol. The latter was dried under vacuum for 2 days.

B1 Molecular weight analysis by triple detection size exclusion chromatography (SEC) $M_n$=10 500 gmol$^{-1}$, $M_w$=13 000 gmol$^{-1}$, $M_w/M_n$=1.23

Further examples of poly(styrene-$d_8$) made according the method described above:

B2 prepared from dendron A2 in corresponding manner to that for preparing B1, but using stoichiometric ratio of monomer to dendron, to obtain a different molecular weight polystyrene chain $M_n$=15 100 gmol$^{-1}$, $M_w$, =19 000 gmol$^{-1}$, $M_w/M_n$=1.26

B3 prepared from dendron A4

$M_n$=10 200 g mol$^{-1}$, $M_w$=12 300 gmol$^{-1}$, $M_w/M_n$=1.21

$\delta_H$(CDCl$_3$) 2.09 (CH$_2$CH$_2$CH$_2$ initiator), 2.28 (CH$_2$CF$_2$ initiator), 4.01 (CH$_2$CH$_2$O initiator), 4.97 (CCH$_2$O initiator), 6.25-6.55 (ArH initiator). Note: Polystyrene is deuterated.

EXAMPLE B4

Synthesis of Poly(Methyl Methacrylate) from Dendron A2

Poly(methyl methacrylate) was prepared using copper mediated living radical polymerisation as above. The synthesis of B4 is described below:

Cu(I)Cl (0.025 g, 0.25 mmol) and A2 (0.281 g, 0.25 mmol) were placed together with a magnetic stirrer bar in an oven-dried Schlenk tube. The tube was fitted with a rubber septum and pump filled with nitrogen three times. Degassed N-(n-propyl)-2-pyridylmethanimine (0.078 mL, 0.50 mmol), methyl methacrylate (2.67 mL, 25.0 mmol), toluene (1.35 mL) and 1,3-bis(trifluoromethyl)benzene (1.35 mL) were transferred to the Schlenk tube via syringe. The solution was further degassed by three freeze-pump-thaw cycles. The tube was then lowered in a thermostatically controlled oil-bath at 90° C. and left for 23 hours under nitrogen. Purification was achieved by allowing the solution to cool, diluting in toluene and passing through a column of aluminium oxide. The solution collected was concentrated and the polymer precipitated in hexane. The latter was dried under vacuum for 2 days.

B4 $M_n$=29, 200 gmol$^{-1}$, $M_w$=39, 600 gmol$^{-1}$, $M_w/M_n$=1.36

$\delta_H$(CDCl$_3$) 0.60-1.20 (CH$_3$ PMMA backbone), 1.30-2.20 (CH$_2$ PMMA backbone), 3.55 (OCH$_3$ PMMA), 4.01 (t, CH$_2$O initiator), 6.21 and 6.24 (Ar—H initiator).

EXAMPLE B5

Synthesis of Poly(D,L-Lactide) from Dendron A1

Poly(D,L-lactide) was prepared by ring opening polymerisation using dendron of A1 and tin(II) octoate. A1 (0.113 g, 0.107 mmol), tin(II) octoate (0.037 mmol) and D,L-lactide (1.08 g, 7.49 mmol) were added to an evacuated Schlenk tube in a glove box.

The tube was filled with nitrogen, fitted with a rubber septum and lowered in a thermostatically controlled oil-bath at 155° C. The reaction was left for 5 hours under nitrogen. Purification was achieved by allowing the mixture to cool, diluting in THF and precipitating in hexane four times. The polymer was dried under vacuum for 2 days.

B5 SEC data relative to polystyrene standard. $M_n$=12 300 gmol$^{-1}$, $M_w$=21 600 gmol$^{-1}$, $M_w/M_n$=1.76

$\delta_H$(CDCl$_3$) 1.26 (CH$_3$ pol. end), 1.56 (CH$_3$ pol. backbone), 2.09 (m, CH$_2$CH$_2$CH$_2$ initiator), 2.30 (m, CH$_2$CF$_2$ initiator), 4.02 (t, CH$_2$CH$_2$O initiator), 4.36 (CH pol. end), 5.18 (CH pol. backbone), 6.40 and 6.46 (ArH initiator).

EXAMPLE B6

Synthesis of Poly(Acetoxystyrene) from Dendron A2

Poly(acetoxystyrene) was prepared using copper mediated living radical polymerisation. Cu(I)Br (0.032 g, 0.223 mmol), A2 (0.25 g, 0.0233 mmol) and 2,2'-dipyridyl (0.069 g, 0.446 mmol) were placed together with a magnetic stirrer bar in an oven-dried Schlenk tube. The tube was fitted with a rubber septum and pump filled with nitrogen three times. Acetoxystyrene was degassed by bubbling nitrogen through it and then transferred (2.115 ml, 14 mmol) into the Schlenk tube via a syringe. The mixture was further degassed by three freeze-pump-thaw cycles. The tube was then heated under nitrogen at 90° C. for 16 hours. Purification was achieved by allowing the mixture to cool, dissolving the resultant solid in toluene and filtering the solution to remove the catalyst. The polymer was then precipitated into methanol, redissolved in toluene and reprecipitated once more before collecting the polymer by filtration and drying to constant mass in vacuo. Molecular weight by triple detection SEC (using polystyrene dn/dc of 0.185) $M_n$=7,800 gmol$^{-1}$, $M_w$=8,500 gmol$^{-1}$, $M_w/M_n$=1.1.

EXAMPLE B7

Synthesis of Poly(Vinylphenol) from Dendron A2

Poly(vinyl phenol) was prepared by hydrolysis of poly (acetoxystryene), B6, according to literature procedure of Chen et al, J. Polym. Sci.: Part A: Polym. Chem. 1999, 37, 627-633.

EXAMPLE B8

Synthesis of PMMA from Dendron A5

B8 was prepared from dendron A5 according to the method described for B4 with the exceptions that Cu(I)Br was used instead of Cu(I)Cl and 1,3-bis(trifluoromethyl) benzene was not used as a co-solvent, reaction left for 5 hours
$M_n$=6 700 gmol$^{-1}$, $M_w$=8 600 gmol$^{-1}$, $M_w/M_n$=1.28 (relative to polystyrene standards)
$\delta_H$(CDCl$_3$) 0.60-1.20 (CH$_3$ PMMA backbone), 1.30-2.20 (CH$_2$ PMMA backbone), 3.52 (OCH$_3$ PMMA), 3.99 (CH$_2$CH$_2$O initiator), 4.95 (CH$_2$OCO initiator), 6.38 and 6.49 (Ar—H initiator).

EXAMPLE B9

Synthesis of Polystyrene from Dendron A8

B9 was prepared from dendron A8 by the same method as that described for B1.
$M_n$=5 500 g mol$^{-1}$, $M_w$=7 000 gmol$^{-1}$, $M_w/M_n$=1.28

EXAMPLE B10

Synthesis of PMMA from Dendron A9

B10 was prepared from dendron A9 according to the method described for B4 with the exceptions that Cu(I)Br was used instead of Cu(I)Cl and 1,3-bis(trifluoromethyl) benzene was not used as a co-solvent, reaction left for 7 hours.
$M_n$=7 300 gmol$^{-1}$, $M_w$=8 200 gmol$^{-1}$, $M_w/M_n$=1.13 (relative to polystyrene standards)

EXAMPLE B11

Synthesis of Polystyrene Prepared from Dendron A10

We have used A10 to initiate the polymerisation of styrene and with a post polymerisation hydrolysis reaction the ester functionalities are converted into carboxylic acid groups. Although there is not the same inherent driving force (that there is with fluorinated materials) to take these materials to an air polymer interface, annealing in a polar environment, such as under glycerol or another polar solvent, results in very strong adsorption to the air polymer interface (see Characterisation below)

B11 was prepared dendron A10 according to the method described for preparing B1 (reaction left for 40 hours), but using stoichiometric ratio of monomer to dendron to obtain a molecular weight of approximately 20,000 gmol$^{-1}$.
$M_n$=21 100 g mol$^{-1}$, $M_w$=27 700 gmol$^{-1}$, $M_w/M_n$=1.31
$\delta_H$(CDCl$_3$) 1.42 (CH$_3$ initiator), 4.39 (OCH$_2$ initiator), 7.85 and 8.45 (ArH initiator).

EXAMPLE B12

Hydrolysis of B11 to Give Polystyrene End Capped with Two Carboxylic Acid Groups Ester hydrolysis was carried out as follows: To a solution of B11 (0.600 g, 0.28 mmol) in THF (10 mL), was added a solution of KOH (0.027 g, 0.480 mmol) in water (0.5 mL). The mixture was refluxed overnight, then allowed to cool to ambient temperature. The mixture was neutralized with HCl and precipitated in a 1:1 MeOH/H$_2$O solution. The polymer was filtered and washed with a large amount of water, followed by methanol. The solid was dried at 50° C. under vacuum for 24 hours (0.540 g, 90%). Disappearance of ester peak at 4.39 ppm in the $^1$H NMR confirmed hydrolysis.

EXAMPLE B12

Synthesis of Polystyrene (Target Molecular Weight 10,000 gmol$^{-1}$ by Anionic Polymerisation and Post Polymerisation End Capping with A2 (See Scheme 4)

Styrene is polymerised by anionic polymerisation using standard high vacuum techniques. Toluene (50 ml) and styrene (5.0 g, 0.048 mol) are distilled under vacuum into the reaction flask. After one freeze-pump-thaw cycle, sec-butyl lithium (0.36 ml, 5.0×10$^{-4}$ mol of 1.4 M solution in cyclohexane) initiator is injected via a rubber septum. Upon addition of the initiator the characteristic orange colour of living polystyryllithium is observed. Polymerisation is carried out at room temperature for two hours to ensure complete consumption of monomer. The reaction mixture is then cooled down to −78° C. using a solid CO$_2$/acetone bath and THF (50 ml) added via distillation followed by the injection of 1,1-diphenylethylene (0.135 g, 7.5×10$^{-4}$ mol) to end cap the living polymer. The mixture was stirred for a further two hours before adding A2 (0.562 g, 5.0×10$^{-4}$ mol) as a solution in THF. The success of the reaction is accompanied by the loss of the red/orange colour associated with the living anionic chain end. The polymer is recovered by precipitation into excess methanol and the product recovered by filtration and dried.

EXAMPLE B13

Synthesis of End Capped Polyethylene Terephthalate Pet by a Post Polymerisation End-Capping Reaction Polyethylene terephthalate (PET) (5.0 g, 2.5×10$^{-3}$ mol) with a molecular weight (Mn) of 2000 gmol$^{-1}$ and a concentration of hydroxyl end groups of 918 gm equivalents per $10^6$ gm and A6 (3.91 g, $2.5 \times 10^{-3}$ mol) are dried under vacuum at 120° C. for 24 hours. To the dried polymer is added 90 ppm of manganese acetate, a good transesterification catalyst. The mixture is then heated up to 270° C. with stirring for several hours under continuous vacuum (to remove methanol, the transesterification by product. Upon cooling the product is extracted from the reaction flask by dissolving it in hexafluoroisopropanol and then precipitating into excess methanol. The product is then recovered by filtration and dried.

EXAMPLE B14

Synthesis of Polystyrene from Dendron A12

B14 is prepared from dendron A12 by copper mediated living radical polymerisation using Cu(I)Br and 2,2'-dipyridyl according to the method described for the preparation of B9

C—Preparation of a Solution of a Polymer Blend-of Additive of Formula I and Bulk Polymer $P_B$ Examples C1 to C3 were made according to the following:

A series of polymer blends of the invention D-$P_D$ and bulk polymer $P_B$ were prepared in which the concentration of D-$P_D$ in the blend-was varied. In each case $P_B$ was polystyrene of molecular weight $M_n$ of 250,000 and polydispersity of 1.05. The blend-was prepared by dissolving the appropriate amount of each component in toluene, so as to give a total concentration of polymer in toluene of 3% w/v. The solutions were left overnight and agitated gently to ensure that the dissolved components were fully mixed. The solutions were used directly for solvent casting.

EXAMPLE C1

Blend-of B1 in bulk polystyrene. A series of blends were prepared as described above in which the weight percent of B1 in the blend-was 1, 2, 4, 7.5, 10, 15, 25, 50, 75 and 100%

EXAMPLE C2

Blend-of B2 in bulk polystyrene. A series of blends were prepared as described above in which the weight percent of B2 in the blend-was 1, 2, 4, 7.5, 10, 15, 25, 50, 75 and 100%

EXAMPLE C3

Blend-of B3 in bulk polystyrene. A series of blends were prepared as described above in which the weight percent of B3 in the blend-was 1, 2, 4, 7.5, 10, 15, 25, 50 and 75%
D—Solvent Casting of Films of Polymer Blends of Examples C1-C3

EXAMPLES D1 TO D3

Solvent casting of all examples of polymer blends C1-C3 were carried out using a Cammax PRS14E photoresist spinner. Polymer blend-solutions were spin-coated onto silicon substrates. In each case the substrate was placed on the centre of the chuck of the photoresist spinner, and approximately 0.5 ml of the co-solution was deposited onto the substrate immediately prior to spinning. Spinning was carried out for at least 10 seconds at a speed of approximately 2000 rpm during which time the solution spread to cover the substrate and excess solvent evaporated, leaving a smooth dry film of approximately 100 nm total thickness.

The preceding protocol was used, using toluene solvent, but is not the only way to prepare these films. Other solvents such as THF, xylene, or chloroform could be used equally well. The overall weight fraction was chosen to provide films of the desired thickness at the spinning speed used, however there is a trade off between spinning speed, solution concentration, solvent volatility and polymer molecular weight. The same procedure could be applied to most smooth solid substrates.

E—Properties of Additives D-$P_D$ and Blends of Additives with Bulk Polymer of Examples B and C Above The properties of the additives and blends of the additives with bulk polymer were characterized using ion beam analysis (IBA) and solvent contact angle measurements. In examples C1-3, component $P_D$ of the additive D-$P_D$ (formula I), is deuterated polystyrene, therefore IBA enables measurement of the distribution of additive D-$P_D$ in the solvent cast film of the blend, as a function of depth. That is, IBA answers the question does the additive segregate to the air-polymer interface?

Solvent contact angle measurement enables characterization of the surface energy of the film and indicates the degree of hydrophobicity/lipophobicity of the film.

EXAMPLE E1

Influence of Number of Surface-Active Functional Groups on their Organization in Thin Films Previous studies using IBA measurements on a solvent cast film of a polymer blend-comprising a polymer with a single fluorocarbon group $(CH_2)_2(CF_2)_5CF_3$ in bulk polymer showed that the single fluorocarbon group in the comparative blend-promoted segregation of the additive to the air-polymer interface but had little effect on the surface energy of the film as evidenced by contact angle measurements. Whilst the surface volume fraction of the fluorocarbon functionalized polymer approached 40%, the contact angle of water remained unaltered.

In similar studies on blends of the invention of the additive D-$P_D$ and bulk polymer $P_B$, additive comprising 2 or 4 fluorocarbon groups $CF_3(CF_2)_7(CH_2)$ adsorbed to the surface of the film within the period of the spin coating process.

Ion beam analysis was carried out using an NEC 5SDH Pelletron accelerator with $^3$He+ beams of 0.7 MeV energy. This method allows absolute determination of the concentration profile of deuterium-labeled polymers in a normal (unlabeled) matrix. Blended films comprising the additive of the invention at a variety of weight fractions in a matrix of polystyrene were prepared using the method described previously. Ion beam analysis showed that the concentration of the additive of the invention immediately adjacent to the air-polymer interface of the blended film far exceeded its concentration elsewhere in the film. We define the amount by which this concentration exceeds the bulk concentration as the surface excess, and for clarity the surface excess is given as the number of molecules of the additive of the invention per square nanometer. Typical data for the surface excess of the invention are shown in Table 1

TABLE 1

Surface excess data obtained for the additive of the
invention as a function of number of fluorocarbon groups.

| Weight % of additive in blend | Surface excess (molecules/nm$^2$) | | | |
|---|---|---|---|---|
| | 2 C$_8$F$_{17}$ groups | | 4 C$_8$F$_{17}$ groups | |
| | Unannealed | Annealed | Unannealed | Annealed |
| 7.5 | 0.103 | 0.193 | 0.231 | 0.433 |
| 10 | 0.279 | 0.305 | 0.226 | 0.380 |
| 15 | 0.272 | 0.306 | 0.282 | 0.465 |

We have found that annealing the sample for a short period (15 minutes at 160° C.) leads to a systematic increase in the surface excess. Moreover, we have found that the presence of 4 C$_8$F$_{17}$ (CF$_3$(CF$_2$)$_7$(CH$_2$)) groups gives rise to a larger surface excess than the material that is similar in all respects except that it has only 2 C$_8$F$_{17}$ groups. The surface excess of the invention with 2 C$_8$F$_{17}$ groups increases with increasing weight fraction in the matrix. However our data show that the surface excess of the invention with 4 C$_8$F$_{17}$ is less sensitive to increasing concentration than its counterpart with 2 C$_8$F$_{17}$ groups.

Similar experiments on the versions of the invention with smaller fluorocarbon groups (CF$_3$, as opposed to C$_8$F$_{17}$) showed no surface excess concentration of the invention at the film surface, so confirming that the C$_8$F$_{17}$ functional groups are responsible for adsorption of the invention at film surfaces.

EXAMPLE E2

Influence of the Number of Fluorinated Groups on Surface Properties

We have compared surface properties of thin films produced by solvent casting of pure bulk polystyrene to films of blends of the additive of the invention D-P$_D$ in bulk polystyrene at various concentrations of additive, examples C1 and C3. Static contact angle measurements were carried out at room temperature using a ramé-hart goniometer model 100. Contact angles were measured for annealed and unannealed films using water and dodecane and all data quoted is the average of at least three separate measurements Annealing was achieved by heating for 1 hour at 165° C. The solvent contact angle of water with the comparison was about 90° and the solvent contact angle of dodecane with the comparison was 0°. The solvent contact angle of water and dodecane with films of the blends, examples C1 and C3 are shown in Tables 2 and 3.

TABLE 2

Contact Angle Measurements on blends of B1 in bulk polystyrene

| Weight % B1 in blend | Solvent contact angle [°] | | | |
|---|---|---|---|---|
| | Unannealed (water) | Annealed (water) | Unannealed (dodecane) | Annealed (dodecane) |
| 1 | 93 | 96 | 16 | 16 |
| 2 | 95 | 94 | 17 | 20 |
| 4 | 96 | 95 | 17 | 20 |
| 7.5 | 101 | 99 | 22 | 30 |
| 10 | 100 | 102 | 25 | 28 |
| 15 | 100 | 102 | 23 | 32 |
| 25 | 101 | 104 | 25 | 35 |
| 50 | 100 | 103 | 30 | 35 |
| 75 | 100 | 105 | 32 | 34 |
| 100 | — | 103 | — | 33 |

TABLE 3

Contact Angle Measurements on blends of B3 in bulk polystyrene

| Weight % B3 in blend | Solvent contact angle [°] | | | |
|---|---|---|---|---|
| | Unannealed (water) | Annealed (water) | Unannealed (dodecane) | Annealed (dodecane) |
| 1 | 93 | 97 | 17 | 18 |
| 2 | 101 | 102 | 25 | 33 |
| 4 | 107 | 105 | 42 | 54 |
| 7.5 | 107 | 106 | 46 | 55 |
| 10 | 109 | 107 | 49 | 62 |
| 15 | 110 | 107 | 55 | 62 |
| 25 | 110 | 109 | 55 | 63 |
| 50 | 109 | 110 | 57 | 63 |
| 75 | 108 | 110 | 59 | 65 |
| 100 | — | — | — | — |

In all examples of C1 and C3 the contact angle measurements of blends of the invention surprisingly showed significantly increased contact angles both with water and dodecane, relative to the comparison, indicating a much reduced surface energy and increased hydrophobicity and lipophobicity. Furthermore contact angle measurements with both water and dodecane show that there is an increase in contact angle with increasing concentration of the additive; the largest increases in contact angle being observed at lower concentrations.

Examples C3, blends of additive with 4 fluorocarbon groups showed more highly increased contact angles than examples C1, blends of additive with 2 fluorocarbon groups. In all other criteria additives B1 and B3 are practically identical.

Furthermore in the examples C3, blends of the invention containing as little as 4% of additive D-P$_D$ (which corresponds to about 1% by weight of dendron) showed a contact angle with water of about 107°. A result that surprisingly was not significantly improved upon by increasing the amount of additive in the blend. This observation when combined with the results of the IBA suggests that even at low concentrations, adsorption of the additive at the surface of the film is approaching saturation. This particular advantage of the invention results in efficient use of functionality.

The validity of absolute surface energy determination extracted from contact angle data is controversial. [Fabio Garbassi, Marco Morra and Ernesto Occhiello, "*Polymer Surfaces. From Physics to Technology*", Wiley, Chichester (1994).] However, using the Good-Girifalco equation substituted into the Young equation, we can readily obtain the relative decrease in surface energy due to the adsorption of the additive of the invention. In this case, the additive of the invention with 4 fluorocarbon groups (A4) reduces the surface energy of the polystyrene matrix by up to 50%, whereas the additive of the invention with 2 fluorocarbon groups (A2) reduces the surface energy of the polystyrene matrix by up to 16%.

EXAMPLE E3

Adsorption of Additive to Surface

The data in tables 1, 2 and 3 suggest that adsorption of the additive to the air-polymer interface of the solvent cast film examples C1 and C3 is surprisingly rapid. In most examples subsequent annealing did not achieve any further increase in contact angle with water, or any significant increase. However we find that subsequent annealing did lead to further increases in the contact angle with dodecane.

However, in Table 4 for blends of additive B2, in which $P_D$, the polymer chain component of additive $D-P_D$ has a higher molecular weight ($M_n$ 15,100 gmol$^{-1}$) than $P_D$ in B1 and B3 ($M_n$ circa 10,000 gmol$^{-1}$) there is some difference between the data for unannealed and annealed films, suggesting that adsorption is slowed by the high molecular weight $P_D$ chain.

TABLE 4

Contact Angle Measurements on blends of B2 in bulk polystyrene

| | Contact angle [°] | | | |
|---|---|---|---|---|
| Weight % B2 in blend | Unannealed Film (water) | Annealed Film (water) | Unannealed Film (dodecane) | Annealed Film (dodecane) |
| 1 | 90 | 92 | 11 | 12 |
| 2 | 90 | 92 | 10 | 12 |
| 4 | 92 | 93 | 17 | 17 |
| 7.5 | 95 | 98 | 15 | 21 |
| 10 | 95 | 96 | 17 | 23 |
| 15 | 97 | 97 | 22 | 21 |
| 25 | 98 | 103 | 21 | 25 |
| 50 | 96 | 102 | 20 | 28 |
| 75 | 100 | 103 | 25 | 26 |
| 100 | 100 | 103 | 24 | 29 |

EXAMPLE E4

Influence of Structure of Polymer

We compared the additive of the invention with a linear block copolymer of styrene with 4-(3-perfluorooctylpropoxy)styrene, with identical fluoroalkyl groups. Thus the fluorinated functionalities are arranged in a linear block rather than at the periphery of a dendron. Films of pure material of the comparison were subjected to solvent contact angles and with 7 fluoroalkyl groups, the contact angle with water of the comparison was 107°, with 19 fluoroalkyl groups it increased to 112° and with 31 fluoroalkyl groups to 116°. Accordingly the increase in surface hydrophobicity to be gained with polymer comprising multiple fluoroalkyl groups arranged as a linear block at one chain end-fails to surpass or to significantly surpass 4 fluoroalkyl groups arranged at the periphery of a dendron as demonstrated in the invention.

Furthermore, films comprising pure material of the comparison fail to significantly surpass blends of the invention containing as little as 4% by weight of the additive of the invention.

In a similar comparison of solvent contact angles with dodecane, films of blends of the invention containing 4% by weight of additive (which corresponds to about 1% by weight of dendron) with 4 fluoroalkyl groups surprisingly significantly surpassed films of pure material of the comparison comprising 7 fluoroalkyl groups. Contact angle with dodecane of the pure material of the comparison with 7 fluoroalkyl groups was 48°, with 19 fluoroalkyl groups increased to 67° and with 31 fluoroalkyl groups to 69°. A film of a blend-comprising 4% by weight of the additive (which corresponds to about 1% by weight of dendron) of the invention with 4 fluoroalkyl groups gave a contact angle with dodecane of 54°.

We also compared the additive of the invention with a linear polystyrene end-functionalized with multiple identical fluoralkyl groups arranged in a dendritic fashion of different structure to the dendron of the invention. Surprisingly films of pure material of the comparison fail to surpass, or significantly surpass a film comprising 4% by weight of additive (which corresponds to about 1% by weight of dendron) of the invention with 4 fluoroalkyl groups. Contact angle with water of pure material of the comparison with 4 fluoroalkyl groups was 105°, with 8 fluoroalkyl groups increased to 107° and with 16 fluoroalkyl groups to 113°. Contact angle with dodecane of pure material of the comparison with 4 fluoroalkyl groups was 48°, with 8 fluoroalkyl groups was 49°, with 16 fluoroalkyl groups was 59°.

F: Characterisation Information
F1: Fluorinated Dendrons.
F1.1 Contact Angle Measurements for PMMA with 2 CF Groups Contact angle measurements with water were obtained for PMMA example B4.

A series of polymer blends of the invention $D-P_D$ and bulk polymer $P_B$ were made where $P_D$ and $P_B$ were PMMA and in each case $P_B$ had a molecular weight of 480,000 gmol$^{-1}$.

EXAMPLE C4

Blend of B4 in bulk PMMA. A series of blends were prepared in which the weight percent of B4 was 1, 5, 10, 15, 20 and 25%

Contact angles of water and dodecane were subsequently recorded on spin coated films of the blends both as spun and after annealed for one hour at 150° C.

TABLE 4

Contact Angle Measurements on blends of B4 in bulk polystyrene

| Weight % | Contact angle/water | | Contact angle/dodecane | |
|---|---|---|---|---|
| B4 in blend | Unannealed | Annealed | Unannealed | Annealed |
| 1 | 71 | 70 | 0 | 0 |
| 5 | 74 | 77 | 0 | 0 |
| 10 | 82 | 88 | 0 | 17 |
| 15 | 84 | 92 | 0 | — |
| 20 | 98 | 94 | 0 | 31 |
| 25 | 98 | 96 | 0 | 30 |

In example C4 contact angle measurements of the invention as applied to PMMA show significant increases in hydrophobicity in comparison to unmodified PMMA, which shows a contact angle of 67°. With approximately 20 weight percent of the additive B4 (corresponding to approximately 0.66% of dendron) increases in contact angle of 30° were observed. Similarly lipophobicity was also significantly increased with contact angles of 30° obtained for annealed films containing 20 weight percent of the additive.

F1.2 Poly(d,l-Lactide) (PLA) with 2 CF Groups (Example B5)

Contact angle measurements with water and dodecane were obtained for PLA example B5 and the results are shown in table 6.

TABLE 5

Contact Angle Measurements on B5 and pure PLA

| Weight % B5 | Solvent contact angle [°] | |
|---|---|---|
| | Water | Dodecane |
| 0 | 66 | 0 |
| 100 | 103 | 46 |

In example C5 contact angle measurements of the invention as applied to PLA show that for a film of pure additive B5, hydrophobicity is significantly higher as evidenced by a contact angle of 103° with water compared to unmodified PLA which shows a contact angle of 66°. There is a similarly significant increase in lipophobicity with pure additive B5 having a contact angle with dodecane of 46° compared to pure PLA on which dodecane completely spreads giving no measurable contact angle. All data obtained on films which had been annealed for 1 hour at 90° C.

F2 Non Fluorinated Dendrons.

Blended films comprising the additive of the invention D-$P_D$ where $P_D$ is (deuterated) polystyrene and dendron D is decorated with two carboxylic acid groups were prepared as described. IBA showed NO significant segregation to the air-polymer interface for the as spun film, however after annealing in a polar environment, for example by dipping the film into glycerol at 150° C., a significant surface excess was observed. From the surface excess data it is possible to estimate the number of COOH functional groups per square micron of film surface. For the D-$P_D$ structure described (example B12) this figure approached 320 000 COOH groups per square micron after 10 minutes in glycerol at 150° C. This value compares favourably with 50 000 COOCH$_3$ groups per square micron for the precursor material B11, and 30 000 COOH groups per square micron for a linear deuterated polystyrene (53.3 kg/mol) having just one COOH functionality per polymer chain. This demonstrates that such an annealing process is a very effective way of populating the surface of a polymer with high surface energy polar groups such as COOH. However, the presence of two COOH groups at the chain end of the B12 additive results in only 11% surface coverage, which is insufficient to cause a significant reduction in the contact angle with water.

The invention claimed is:

1. A polymer blend comprising a bulk polymer or copolymer $P_B$ together with an amount of a polymer-dendron additive D-$P_D$ of the formula (I):

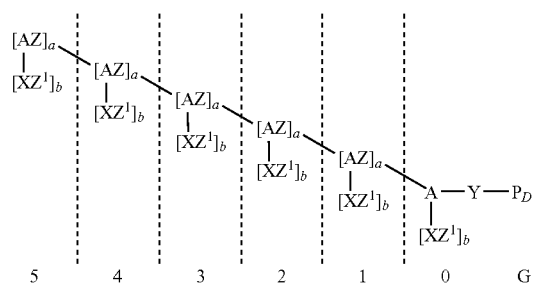

(I)

wherein the polymer blend comprises from 0.001 to 50% of the dendron-additive D-$P_D$ calculated as weight of dendron D in polymers D-$P_D$ and $P_B$;

wherein $P_D$ is the same polymer type as $P_B$; and $P_D$ is a polymer chain comprising at least one monomer repeat unit and is cyclic or has at least two ends and is linked to a group Y;

Y is a linking group;

a and b are each zero or an integer in the range from 1 to 5 wherein one b in a given generation is 0 and a in the next increasing generation is an integer from 1 to 5 and wherein a is 0 in Generation 1, 2, 3, or 4 and b is an integer from 1 to 5 in Generation 0, 1, 2, or 3;

A is phenyls;

each AZ is Ar(CR')$_n$Z, wherein Ar is phenyl, R' is H or —CH$_3$, and n is an integer of from 1 to 12;

each XZ$^1$ is a functional group independently selected from OH, halo, amino, cyano, carboxylic acid, ester, thiol, silane, azide, alkyl, alkenyl, alkynyl, oligoalkyl, oligoalkenyl, oligoalkylether, an organometallic group, a linear, or branched C$_{1-20}$ alkyl group, a linear, or branched C$_{2-20}$ alkenyl group, or C$_{3-20}$ cycloalkyl group optionally comprising an O or S heteroatom; and comprising from 3 to 37 groups selected from halo, OH, NR$_2$, CN, COOH, COOR, SR, SiCl$_3$, SiRCl$_2$ SiR$_2$Cl, and Si(OR)$_3$, and a combination thereof; wherein R is a C$_{1-6}$alkyl group Z is O or S; and G indicates the Generation of a given dendron.

2. The polymer blend as claimed in claim 1 wherein a and b are each 0 or 1, 2 or 3, and each [A-Z] or [XZ$^1$] group is meta (m-), para (p-), or a combination thereof.

3. The polymer blend as claimed in claim 1 wherein the additive of formula I is of formula I$^0$:

(I$^0$)

or of formula I$^1$:

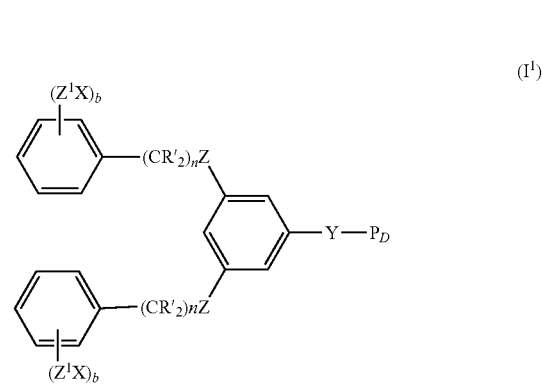

(I$^1$)

or of formula I²:
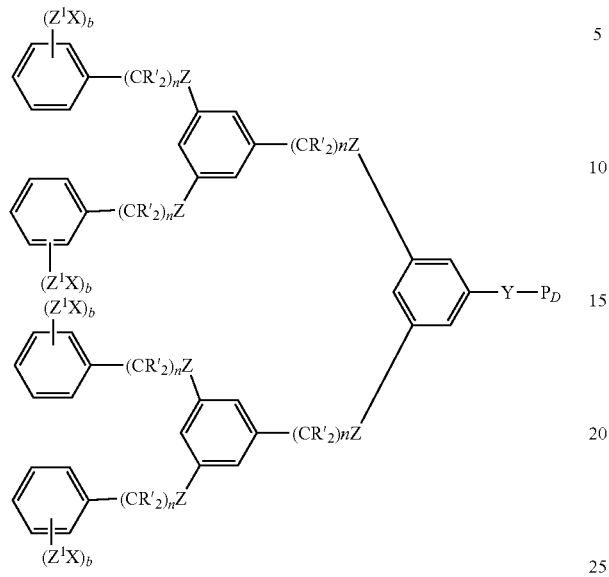
or of formula I³:
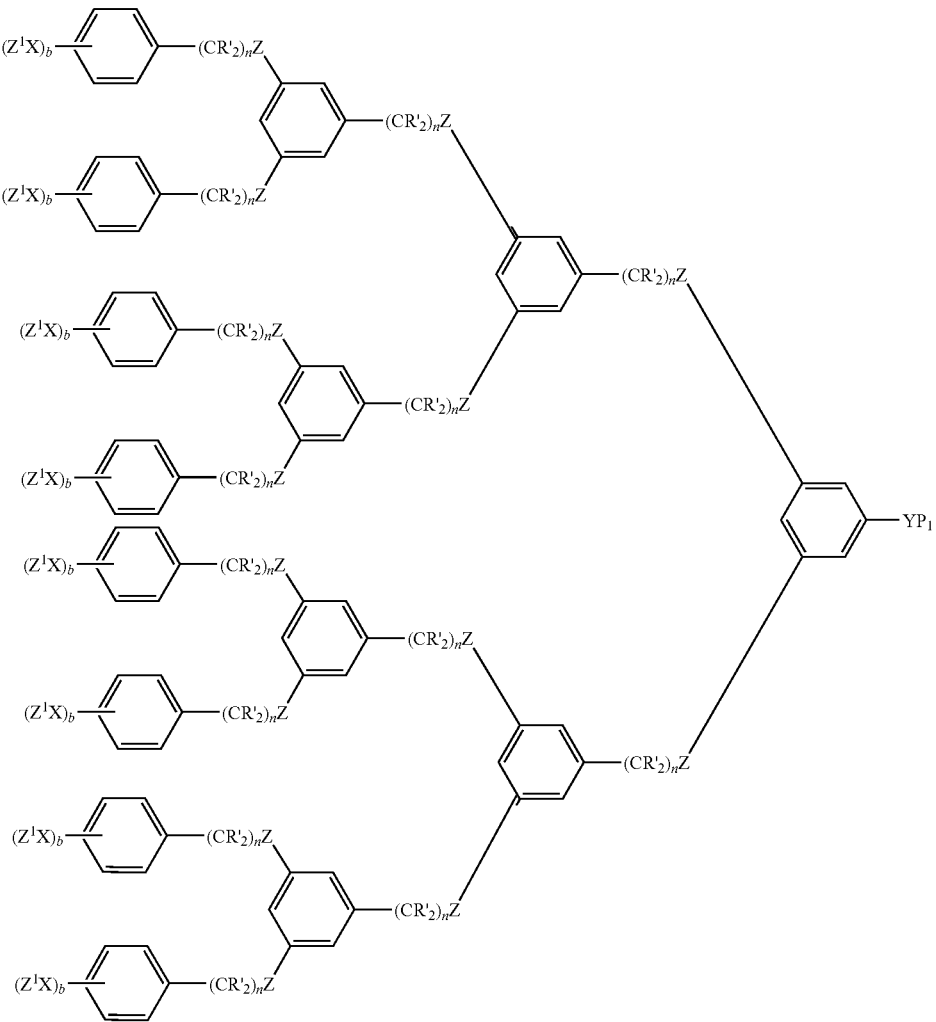

wherein each R' in independently H or CH$_3$.

4. The polymer blend of claim 1 wherein AZ is Ar(CR'$_2$)$_n$Z, where Ar is Phenyl (Ph), R' is H or CH$_3$ and n is an integer from 1 to 12;
each XZ$^1$ is a functional group independently selected from a linear, branched or cyclic C$_{1-20}$ alkyl or cycloalkyl group comprising a heteroatom Z and comprising from 3 to 37 F atoms;
Z is O or S.

5. The polymer blend as claimed in claim 1 wherein XZ$^1$ comprises X and Z,
wherein
X is F$_D$ which is (CR$_2$)$_m$F$_D$'C(F$_D$")$_3$, wherein R is H or CH$_3$, m' is 0 or an integer from 1 to 15; F$_D$' is a C$_{1-10}$ linear perfluoroalkyl; and each F$_D$" is independently F, CH$_2$F, CHF$_2$ or CF$_3$,
or
X is F$_D$ which is a cyclic group (CR$_2$)$_{m'}$, C$_{3-10}$F$_{4-18}$:

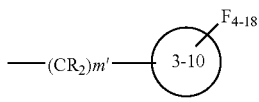

6. The polymer blend as claimed in claim 5 wherein F$_D$ is (CR$_2$)$_m$'F$_D$'C(F$_D$")$_3$; each R is H, and m' is 0 or an integer from 1 to 6.

7. The polymer blend as claimed in claim 6 wherein b is 2 or 3, the F$_D$ are groups are present in meta, para or both positions, Z is O, and R' is H or CH$_3$.

8. The polymer blend as claimed in claim 1 wherein each XZ$^1$ group is an oligobutadiene group.

9. The polymer blend as claimed in claim 1 wherein each XZ$^1$ group is an oligoethylene oxide group.

10. The polymer blend as claimed in claim 1 comprising from 0.001 wt % to 5 wt % of the polymer-dendron additive of formula I calculated as weight of dendron D in polymers D-P$_D$ and P$_B$.

11. The polymer blend as claimed in claim 1 wherein Y—CH$_2$—, —CH=, —S—, —O—, —CH$_2$OPhCH=, —COO—, —CONH—, —COS— and —CO—.

12. The polymer blend as claimed in claim 1 wherein P$_D$ has two chain ends and as a molecular weight Mn from 2,000 to 20,000 g/mol.

13. The polymer blend as claimed in claim 1 wherein P$_D$ has a polydispersity index (PDI) given as Mw/Mn of from 1.0 to 5.0.

14. The polymer blend as claimed in claim 1 wherein P$_B$ has a molecular weight Mn of 5,000 to 1,000,000 g/mol.

15. The polymer blend as claimed in claim 1 wherein P$_B$ or P$_D$ comprise polyesters, poly (ortho esters) poly(amino acids); Poly (pseudo amino acids); polyphosphazenes; azo polymers; polyimides, vinyl polymers poly(ethylene glycol), poly(dimethyl siloxane), polyurethanes, polycarbonates, polypetides and proteins; starch, cellulose; gelatin; alginates; aromatic polyesters; addition-polymerisation resins; formaldehyde condensate resins, glycolic, acid glycolide, lactic acid, lactide, p-dioxanone, dioxepanone, alkylene oxalates, caprolactones or mixtures of two or more thereof.

16. A method for preparing a polymer blend as defined in claim 1 comprising combining an amount of polymer-dendron additive D-P$_D$ of formula I with an amount of a bulk polymer or copolymer P$_B$ to obtain the polymer blend in fluid form as a solution, suspension, or in solid form.

17. The method as defined in claim 16 further comprising shaping the polymer blend to independently form a film, fibre, layer or monolith, or a surface coating of another material.

18. A surface or interface stabilizing aid comprising a polymer-dendron additive D-P$_D$ of formula I as defined in claim 1.

19. The polymer blend as claimed in claim 1 wherein the substitution pattern of each [A-Z] or [X-Z$^1$] group is m-, m-; p-; m-, p-; or m-, p-, m-.

20. The polymer blend as claimed in claim 5 wherein F$_D$' is (CF$_2$)m"; where m" is an integer from 1 to 15.

21. The polymer blend as claimed in claim 20 wherein m" is an integer from 2 to 7.

22. The polymer blend as claimed in claim 5 wherein F$_D$' is a cyclic group and each ring carbon is doubly F substituted and the linking ring carbon is H substituted.

23. The polymer blend as claimed in claim 1 comprising from 0.001 wt % to 2.5 wt % of the polymer-dendron additive of formula I, calculated as weight of dendron D in polymers D-P$_D$ and P$_B$.

24. The polymer blend as claimed in claim 1 comprising from 0.001 wt % to 1 wt % of the polymer-dendron additive of formula I, calculated as weight of dendron D in polymers D-P$_D$ and P$_B$.

25. The polymer blend as claimed in claim 1 wherein P$_D$ has a polydispersity index of from 1.0 to 3.0.

26. The polymer blend as claimed in claim 1 wherein P$_B$ has a molecular weight Mn of 5,000 to 100,000 g/mol.

27. The polymer blend as claimed in claim 15 wherein the polyesters comprise poly(lactide), poly(glycolide), copolymers thereof, or copolymers thereof with poly(ethylene glycol), poly(e-caprolactone), poly(3-hydroxybutyrate), poly(p-dioxanone), or poly(propylene fumarate).

28. The polymer blend as claimed in claim 15 wherein the poly (orthosters) comprise polyol/diketene acctal additional polymers.

29. The polymer blend as claimed in claim 15 wherein the poly polyanhydrides comprise poly(sebacic anhydride) (PSA), poly(carboxybisbarboxy-phenoxyphenoxyhexane), poly[bis(p-carboxyphenoxy) methane], copolymers of sebacic anhydride, carboxybisbarboxyphenoxyphenoxyhexane or bis(p-carboxyphenoxy) methane.

30. The polymer blend as claimed in claim 15 wherein the polyphosphazenes comprise derivatives of poly [(dichloro) phosphazene], or poly [(organo) phosphazenes].

31. The polymer blend as claimed in claim 15 wherein the vinyl polymers comprise polyethylene, poly(ethylene-co-vinyl acetate), polypropylene, polyphenylene oxide, poly (vinyl chloride), poly(vinyl acetate), poly(vinyl alcohol), copolymers of vinyl alcohol and vinyl acetate, poly(acrylic acid), poly(methacrylic acid), polyacrylamides, polymethacrylamides, polyacrylates, polymethylmethacrylates, polystyrene, derivatives thereof, or mixtures thereof.

32. The polymer blend as claimed in claim 15 wherein the polypeptides or proteins comprise collagen or gelatin.

33. The polymer blend as claimed in claim 15 wherein the starch or cellulose derivatives comprise ethylcellulose, methylcellulose, ethylhydroxyethylcellulose, or sodium carboxymethylcellulose, dextran, chitin, chitosan, or derivatives thereof.

34. The polymer blend as claimed in claim 15 wherein the aromatic polyesters comprise PET, or ester urethanes.

35. The polymer blend as claimed in claim 15 wherein the epoxy resins comprise derived from a mono or poly-glycidyl derivative of one or more aromatic diamines, aromatic monoprimary amines, aminophenols, polyhydric phenols, polyhydric alcohols, polycarboxylic acids, or a mixture thereof.

36. The polymer blend as claimed in claim 15 wherein the addition-polymerisation resins comprise acrylics, vinyls, bis-maleimides, or unsaturated polyesters.

37. The polymer blend as claimed in claim 15 wherein the formaldehyde condensate resin comprise urea, melamine and phenols such as a formaldehyde-phenol resin, a cyanate resin, an isocyanate resin, a phenolic resin methacrylates such as methyl or glycidyl methacrylate, tri-methylene carbonate, di-methylene tri-methylene carbonate.

38. The polymer blend as claimed in claim 15 wherein the caprolactone is gamma-caprolactone.

39. The polymer blend as claimed in claim 1 that provides reduced surface energy for anti-fouling applications, improved gloss, oxidative resistance, non-stick surfaces, easy clean surfaces, hydrolysis resistance, process additives, die lubrication, slip agents, or viscosity modification.

40. The method as claimed in claim 16 wherein the solid form comprises granules, powder or flakes.

41. A polymer having the formula:

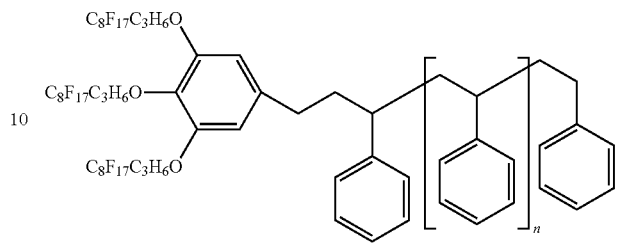

wherein n is an integer from 1 to 12.

* * * * *